US008933930B2

(12) United States Patent
Han et al.

(10) Patent No.: US 8,933,930 B2
(45) Date of Patent: Jan. 13, 2015

(54) NAVIGATION AND FILTERING WITH LAYERS AND DEPTHS FOR BUILDING AUTOMATION GRAPHICS

(75) Inventors: James K. Han, Long Grove, IL (US); Patrick Stirnemann, Besenbüren (CH); Andreas Hersche, Island Lake, IL (US); Ganesh Ramanathan, Unteraegeri (CH)

(73) Assignee: Siemens Schweiz AG, Zug (CH)

( * ) Notice: Subject to any disclaimer, the term of this patent is extended or adjusted under 35 U.S.C. 154(b) by 258 days.

(21) Appl. No.: 13/538,275

(22) Filed: Jun. 29, 2012

(65) Prior Publication Data
US 2013/0083012 A1  Apr. 4, 2013

Related U.S. Application Data

(63) Continuation-in-part of application No. PCT/US2011/054141, filed on Sep. 30, 2011.

(60) Provisional application No. 61/541,925, filed on Sep. 30, 2011.

(51) Int. Cl.
| G06T 15/00 | (2011.01) |
| G05B 23/02 | (2006.01) |
| G05B 15/02 | (2006.01) |
| G06F 3/048 | (2013.01) |

(52) U.S. Cl.
CPC ............ G06F 3/048 (2013.01); G05B 23/0272 (2013.01); G05B 15/02 (2013.01); G05B 2219/2642 (2013.01)
USPC ............................................. 345/419; 700/17

(58) Field of Classification Search
CPC .............................. G06F 3/048; G06F 3/04817
USPC ...................... 345/419, 428; 715/700; 700/17
See application file for complete search history.

(56) References Cited

U.S. PATENT DOCUMENTS

| 6,097,393 | A | * | 8/2000 | Prouty et al. ................... 345/419 |
| 2006/0277501 | A1 | * | 12/2006 | Plocher et al. ................ 715/853 |
| 2007/0240052 | A1 | * | 10/2007 | Sherrill et al. ................ 715/700 |
| 2010/0274366 | A1 | * | 10/2010 | Fata et al. ......................... 700/7 |
| 2011/0007076 | A1 | | 1/2011 | Nielsen et al. |
| 2011/0087988 | A1 | * | 4/2011 | Ray et al. ....................... 715/771 |
| 2011/0088000 | A1 | | 4/2011 | Mackay |
| 2011/0115816 | A1 | * | 5/2011 | Brackney ....................... 345/629 |

OTHER PUBLICATIONS

PCT Search Report dated Aug. 28, 2014, for Application No. PCT/US2012/057245, 8 pages.

* cited by examiner

Primary Examiner — Maurice L McDowell, Jr.

(57) ABSTRACT

Management systems, methods, and mediums. A method includes identifying a set of layers and a zoom factor based on a depth of a graphic to be displayed. The set of layers comprise symbols for objects corresponding to devices in a building managed by the management system. The method includes identifying a number of visible objects from the objects of the symbols in the identified set of layers based on the zoom factor. The method includes identifying a state of a device represented by a visual object in the number of visible objects from the management system communicably coupled with the devices. Additionally, the method includes generating a display for the depth. The display includes the identified set of layers, a symbol for each of the number of visible objects in the identified set of layers, and a graphical indication of the state of the device.

30 Claims, 16 Drawing Sheets

NAVIGATION AND FILTERING WITH LAYERS AND DEPTHS FOR BUILDING AUTOMATION GRAPHICS

CROSS-REFERENCE TO OTHER APPLICATIONS

This application claims priority to PCT Application Ser. No. PCT/US2011/054141, filed Sep. 30, 2011, entitled "Management System with Versatile Display" and to U.S. Provisional Patent Application Ser. No. 61/541,925, filed Sep. 30, 2011, entitled "Management System Using Function Abstraction for Output Generation", both of which are hereby incorporated by reference. This application also shares some subject matter in common with, but is otherwise unrelated to, the following patent applications, filed concurrently herewith, all of which are incorporated by reference:

U.S. patent application Ser. No. 13/537,975 for "Graphical Symbol Animation with Evaluations for Building Automation Graphics";

U.S. patent application Ser. No. 13/538,073 for "Unified Display of Alarm Configurations Based On Event Enrollment Objects";

U.S. patent application Ser. No. 13/537,911 for "Automated Discovery and Generation of Hierarchies for Building Automation and Control Network Objects";

U.S. patent application Ser. No. 13/538,182 for "Management System User Interface in a Building Automation System"; and U.S. patent application Ser. No. 13/538,242 for "Management System User Interface for Comparative Trend View".

TECHNICAL FIELD

The present disclosure is directed, in general, to management systems and, more particularly, to navigation and filtering with layers and depths in a system management application.

BACKGROUND OF THE DISCLOSURE

Building automation systems encompass a wide variety of systems that aid in the monitoring and control of various aspects of building operation. Building automation systems include security systems, fire safety systems, lighting systems, and HVAC systems. The elements of a building automation system are widely dispersed throughout a facility. For example, an HVAC system may include temperature sensors and ventilation damper controls, as well as other elements that are located in virtually every area of a facility. Similarly, a security system may have intrusion detection, motion sensors and alarm actuators dispersed throughout an entire building or campus. Fire safety systems also include widely dispersed devices in the form of smoke alarms, pull stations and controllers. These building automation systems typically have one or more centralized control stations from which system data may be monitored and various aspects of system operation may be controlled and/or monitored.

Building automation systems may include vast numbers of devices and control points that may be communicated with, monitored, and controlled. Historically, management systems used to display and access data for monitoring and controlling operations of the building automation system have been relatively rigid in their user interface architecture. Because building automation systems are by nature unique to the layout and design of the particular building, maneuvering among displays of various elements of a complex, building automation system using a rigid user interface may be difficult and time consuming for building managers. Further, certain management operations of a building automation system may require that time sensitive information be delivered or identifiable in a timely manner.

There is a need, therefore, for an intuitive interface that allows for maneuvering among large numbers of objects and/or points in building automation systems.

SUMMARY OF THE DISCLOSURE

Various disclosed embodiments relate to systems and methods for generating a display associated with a management system in a building.

Various embodiments include management systems, methods, and mediums. A method includes identifying a set of layers and a zoom factor based on a depth of a graphic to be displayed. The set of layers comprises symbols for objects corresponding to devices in a building managed by the management system. The method includes identifying a number of visible objects from the objects of the symbols in the identified set of layers based on the zoom factor. The method includes identifying a state of a device represented by a visual object in the number of visible objects from the management system communicably coupled with the devices. Additionally, the method includes generating a display for the depth. The display includes the identified set of layers, a symbol for each of the number of visible objects in the identified set of layers, and a graphical indication of the state of the device.

The foregoing has outlined rather broadly the features and technical advantages of the present disclosure so that those skilled in the art may better understand the detailed description that follows. Additional features and advantages of the disclosure will be described hereinafter that form the subject of the claims. Those of ordinary skill in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 11 also illustrates an exemplary screen capture of centering or adjusting a center point of the display of a graphic within a pane or window by the system manager application when in a point centering mode in accordance with disclosed embodiments;

FIG. 12 also illustrates an exemplary screen capture of centering or adjusting a center point of the display of a graphic within a pane or window by the system manager application according to a group centering mode in accordance with disclosed embodiments;

DETAILED DESCRIPTION

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device or system.

Embodiments of the present disclosure provide a display of building automation information in customizable and intuitive graphical user interface. Embodiments of the present disclosure provide a grouping of layers of a management system in one or more different viewable depths. Embodiments of the present disclosure provide for modification of a visibility of objects in a depth. Embodiments of the present disclosure provide automatically generated and user definable viewports of various elements in a management system. Further, various embodiments of the present disclosure provide identification of related objects in a management system and centered display of an object or group of related objects.

Figure 1:
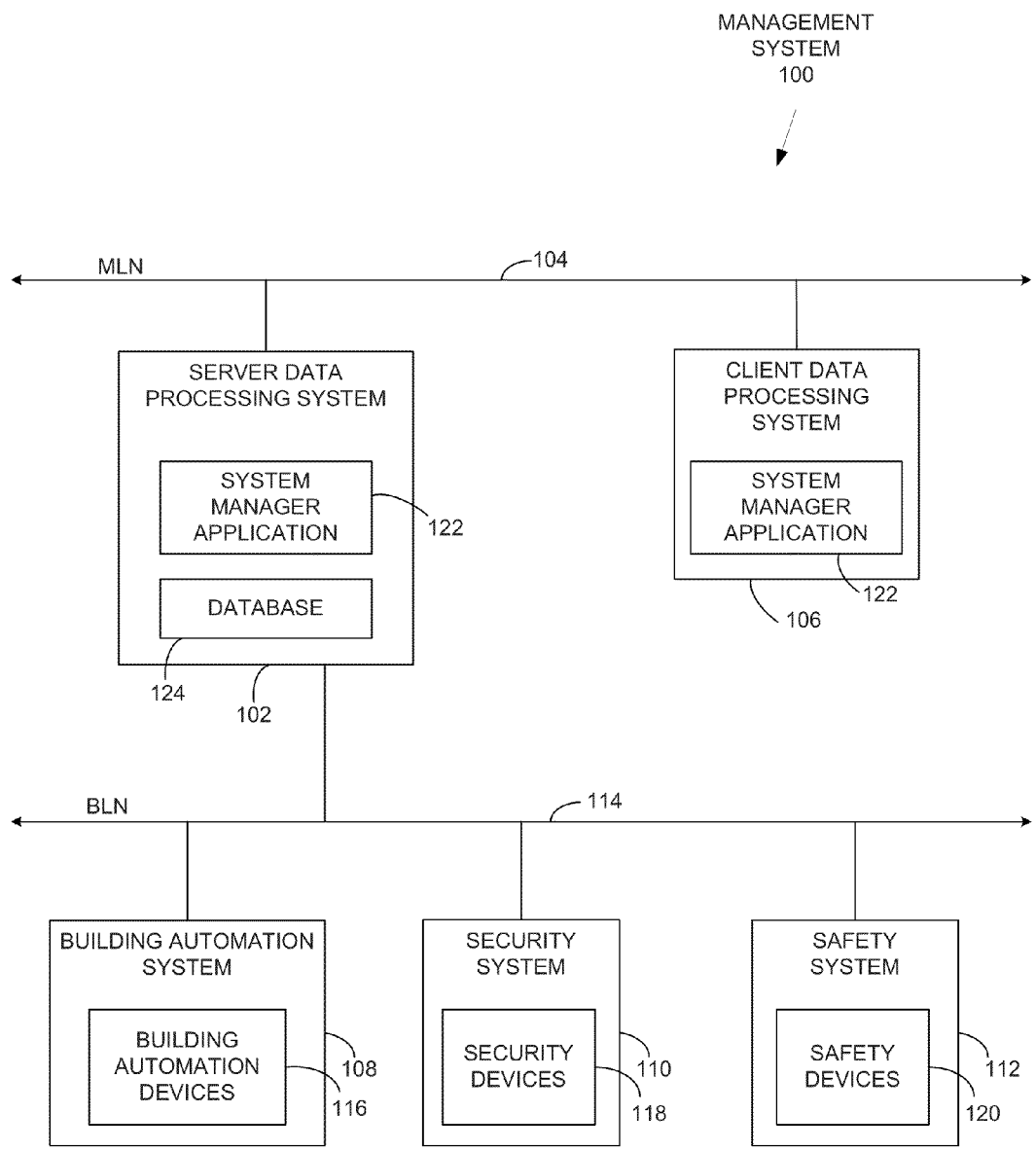
FIG. 1 illustrates a block diagram of a management system in which various embodiments of the present disclosure are implemented.

FIG. 1 illustrates a block diagram of management system 100 in which various embodiments of the present disclosure are implemented. In this illustrative embodiment, the management system 100 includes a server data processing system 102 connected, via a management level network (MLN) 104 to a client data processing system 106. The MLN 104 is a medium used to provide communication links between various data processing systems and other devices in the management system 100. MLN 104 may include any number of suitable connections, such as wired, wireless, or fiber optic links. MLN 104 may be implemented as a number of different types of networks, such as, for example, the internet, a local area network (LAN), or a wide area network (WAN). In some embodiments, elements of the management system 100 may be implemented in a cloud computing environment. For example, MLN 104 may include or be connected to one or more routers, gateways, switches, and/or data processing systems that are remotely located in a cloud computing environment.

In this illustrative embodiment, server data processing system 102 is operably connected to building automation system (BAS) 108, security system 110, and safety system 112 via building level network (BLN) 114. The BAS 108 is an environmental control system that controls at least one of a plurality of environmental parameters within a building or buildings, such as, for example, temperature, humidity, and/or lighting. The security system 110 controls elements of security within a building or buildings, such as, for example, location access, monitoring, and intrusion detection. The safety system 112 controls elements of safety within a building or buildings, such as, for example, smoke, fire, and/or toxic gas detection.

As depicted, the BAS 108 includes building automation devices 116, the security system 110 includes security devices 118, and the safety system 112 includes safety devices 120. In some embodiments, the BAS 108 may encompass the security system devices 118 and safety system devices 120. The devices 116-120 may be located inside or in proximity to one or more buildings managed using management system 100. The devices 116-120 are configured to provide, monitor, and/or control functions of the BAS 108, the security system 110, and/or the safety system 112 within one or more buildings managed using the management system 100. For example, without limitation, the devices 116-120 may include one or more field panels, field controllers, and/or field devices inside or in proximity to one or more buildings. More specifically, devices 116-120 may include one or more general-purpose data processing systems, programmable controllers, routers, switches, sensors, actuators, cameras, lights, digital thermostats, temperature sensors, fans, damper actuators, heaters, chillers, HVAC devices, detectors, motion sensors, glass-break sensors, security alarms, door/window sensors, smoke alarms, fire alarms, gas detectors, etc. The devices 116-120 may use the BLN 114 to exchange information with other components connected to the BLN 114, such as, for example, components within the BAS 108, the security system 110, the safety system 112, and/or the server data processing system 102. One or more of the devices 116-120 may also be connected via one or more field level networks (FLN) to a field panel or field controller for monitoring and controlling the respective field devices within a room, floor or other space of a building. For example, devices in the devices 116-120 may send and receive information to and from other devices in the devices 116-120 using one or more FLNs present in management system 100.

Various embodiments of the present disclosure are implemented in the management system 100. The management system 100 allows for systems and devices located throughout one or more buildings to be managed, monitored, and controlled from a single point and in a uniform manner. For example, a system manager application 122 may be installed on one or more workstations, such as server data processing system 102, client data processing system 106, and/or other devices connected via MLN 104. The system manager application 122 is a collection of software and associated data files that provides a user-modifiable and intuitive graphical user interface for allowing a user to monitor, review and control various points and devices in the management system 100. The system manager application 122 may include, for example, without limitation, executable files, user-layout-definition-files, graphics control modules, an infrastructure interface, and/or a number of software extensions. In some embodiments, system manager application 122 may be an application framework as described in PCT Application Ser. No. PCT/US2011/054141, entitled "Management System with Versatile Display" and U.S. Provisional Patent Application Ser. No. 61/541,925, entitled "Management System Using Function Abstraction for Output Generation".

The server data processing system 102 includes a database that stores information about the devices 116-120 within the management system 100. A database 124 includes one or more data models of data points, devices, and other objects in the management system 100. For example, the database 124 may store values for one or more inputs and outputs of devices in the BAS 108 (e.g., temperature, alarm status, humidity). These values may be referred to as a point or data point. The database 124 may also store static information, such as, model numbers, device types, and/or building and room-installation location information about devices in the management system 100. As referenced herein, a "point" or "data point" may be (i) any physical input or output to or from a respective controller, field device, sensor or actuator, or (ii) any virtual point associated with a control application or logic object within a field controller or field panel of the systems 108-112 that is measured, monitored or controlled. The database 124 may also store graphical models of one or more buildings managed by the management system 100. For example, the graphical models may include layouts and schematics of one or more rooms, floors and buildings managed by the management system 100.

In these illustrative embodiments, objects in the management system 100 include anything that creates, processes or stores information regarding data points, such as physical devices (BAS controllers, field panels, sensors, actuators, cameras, etc.), and maintains data files, such as control schedules, trend reports, calendars, and the like.

In various embodiments, the database 124 includes hierarchy definitions that identify relationships between objects in the system. For example, a hierarchy may include a folder for a "floor" in a building with multiple child folders in the form of "rooms". Each "room" folder, in turn, may have several child objects, such as "ventilation damper", "smoke detector", and "temperature sensor". Such hierarchy definitions among objects may employ conventional BACnet structures or may take many other forms. It will be appreciated that the use of hierarchical files in the management system 100 allows for technicians to define nearly any desirable hierarchy, the result of which is stored as one of the defined hierarchical files, as discussed further below. The database 124 stores files identifying different versions of hierarchies between the objects of the system, including those representative of the devices 116-120.

The system manager application 122 may further include software extensions or services that provide operations of the management system 100. For example, the software extensions may include a print manager, a reporting subsystem, and a status propagation manager. For example, a reporting subsystem implemented on a workstation data processing system (e.g., server data processing system 102 or client data processing system 106) is a system that manages the acquisition of data values from the database 124 for the generation of various reports. Such reports may include, for example, trends for a temperature of a room or the like. In another example, the status propagation manager implemented on a workstation data processing system (e.g., server data processing system 102 or client data processing system 106) propagates alarm status information, among other things, to various other data objects in the system. An example of a suitable alarm propagation system is provided in U.S. patent application Ser. No. 12/566,891, filed Sep. 25, 2009, which is assigned to the assignee of the present invention and is incorporated by reference herein.

In various embodiments, system manager application 122 may, via server data processing system 102 or client data processing system 106, implement scheduling functions of the management system 100. The scheduling function is used to control points in the various systems based on a time-based schedule. For example, the scheduling function may be used to command temperature set points based on the time of day and the day of the week within the building automation devices 116.

The server data processing system 102 is connected to the BLN 114 and includes one or more hardware and/or software interfaces for sending and receiving information to and from the devices 116-120 in the BAS 108, the security system 110, and/or the safety system 112. For example, the server data processing system 102 may request and receive data regarding a status of one or more devices in the devices 116-120. The system manager application 122, via server data processing system 102 or client data processing system 106, provides a user with the functionality to monitor real-time information about the status of one or more devices and objects in the management system 100. The system manager application 122, via server data processing system 102 or client data processing system 106, also provides a user with the functionality to issue commands to control one or more devices and objects in the management system 100. For example, one or more of the devices 116-120 may implement a network protocol for exchanging information within the management system, such as building automation and controls network (BACnet) or local operation network talk (LonTalk) protocols.

Additional descriptions and examples of the management system 100 and components that may be present within the management system 100 may be found in Patent Cooperation Treaty Application Ser. No. PCT/US2011/054141, filed Sep. 30, 2011, entitled "MANAGEMENT SYSTEM WITH VERSATILE DISPLAY" and U.S. Provisional Patent Application Ser. No. 61/541,925, filed Sep. 30, 2011, entitled "MANAGEMENT SYSTEM USING FUNCTION ABSTRACTION FOR OUTPUT GENERATION". Both of these applications are hereby incorporated by reference as if fully set forth herein.

The illustration of the management system 100 in FIG. 1 is not meant to imply physical or architectural limitations to the manner in which different illustrative embodiments may be implemented. Other components in addition to and/or in place of the ones illustrated may be used. Some components may be unnecessary in some illustrative embodiments. For example, any number of data processing systems may be used as workstations in the management system 100, while functions of the system manager application 122 may be implemented in different data processing systems in the management system 100. In other examples, embodiments of the management system 100 may not include one or more of the BAS 108, the security system 110, and/or the safety system 112.

Figure 2:
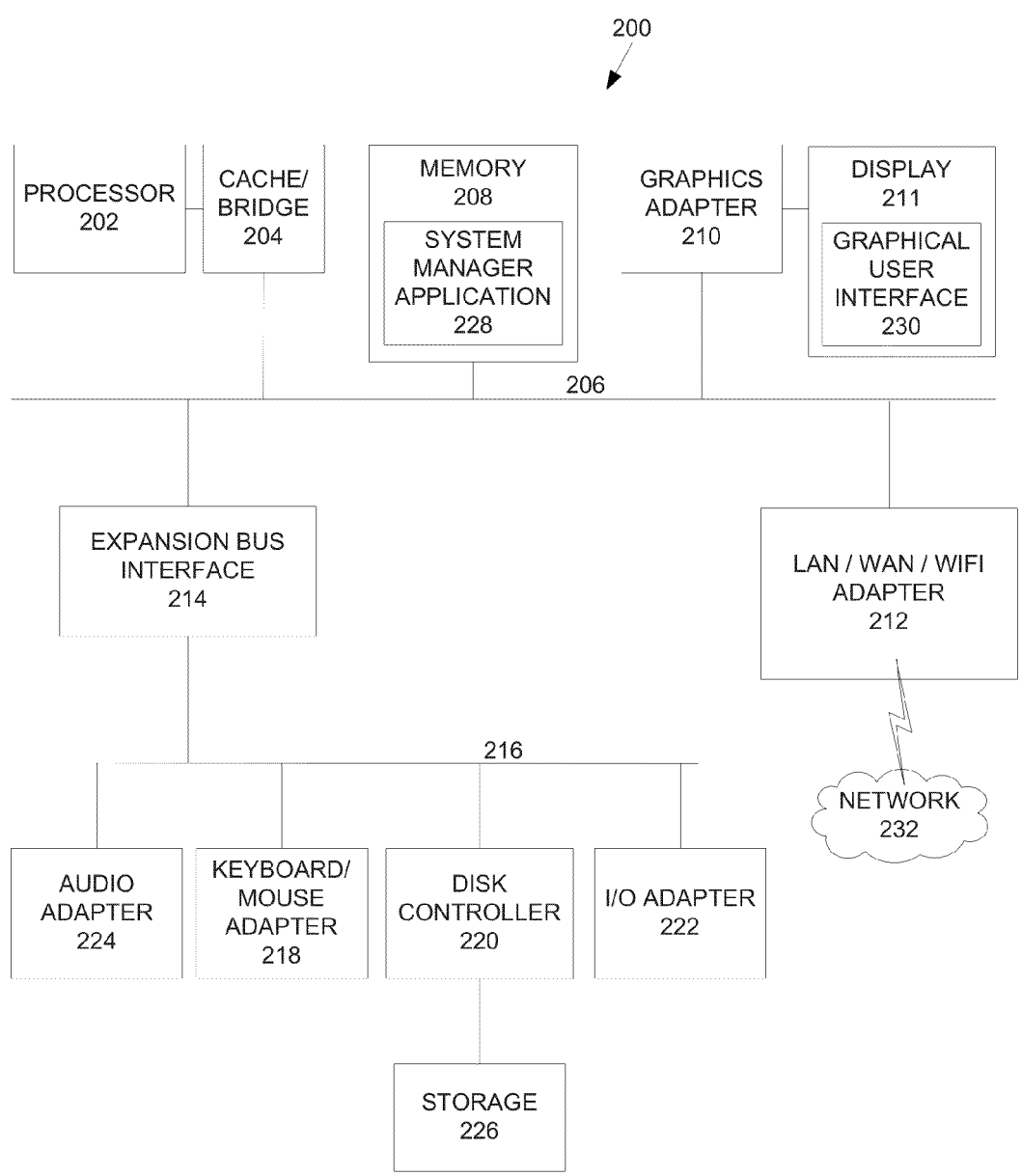
FIG. 2 illustrates a block diagram of a data processing system that may be employed in the management system for implementing various embodiments of the present disclosure.

FIG. 2 depicts a block diagram of a data processing system 200 in which various embodiments are implemented. The data processing system 200 is an example of one implementation of the server data processing system 102 in FIG. 1. The data processing system 200 is also an example of the client data processing system 106.

The data processing system 200 includes a processor 202 connected to a level two cache/bridge 204, which is connected in turn to a local system bus 206. The local system bus 206 may be, for example, a peripheral component interconnect (PCI) architecture bus. Also connected to the local system bus 206 in the depicted example are a main memory 208 and a graphics adapter 210. The graphics adapter 210 may be connected to a display 211.

Other peripherals, such as a local area network (LAN)/Wide Area Network (WAN)/Wireless (e.g. WiFi) adapter 212, may also be connected to the local system bus 206. An expansion bus interface 214 connects the local system bus 206 to an input/output (I/O) bus 216. The I/O bus 216 is connected to a keyboard/mouse adapter 218, a disk controller 220, and an I/O adapter 222. The disk controller 220 may be connected to a storage 226, which may be any suitable machine-usable or machine-readable storage medium, including, but not limited to, nonvolatile, hard-coded type mediums, such as read only memories (ROMs) or erasable, electrically programmable read only memories (EEPROMs), magnetic tape storage, and user-recordable type mediums such as floppy disks, hard disk drives, and compact disk read only memories (CD-ROMs) or digital versatile disks (DVDs), and other known optical, electrical, or magnetic storage devices.

Also connected to the I/O bus 216 in the example shown is an audio adapter 224, to which speakers (not shown) may be connected for playing sounds. The keyboard/mouse adapter 218 provides a connection for a pointing device (not shown), such as a mouse, trackball, trackpointer, etc. In some embodiments, the data processing system 200 may be implemented as a touch screen device, such as, for example, a tablet computer or a touch screen panel. In these embodiments, elements of the keyboard/mouse adapter 218 may be implemented in connection with the display 211.

In various embodiments of the present disclosure, the data processing system 200 is implemented as an installed workstation with a system manager application 228 installed in the memory 208. The system manager application 228 is an example of one embodiment of system manager application 122 in FIG. 1. For example, the processor 202 executes program code of the system manager application 228 to generate graphical user interface 230 displayed on display 211. In various embodiments of the present disclosure, the graphical user interface 230 includes a display of one or more floors or rooms of one or more buildings managed by the management system 100. The graphical user interface 230 provides an interface for a user to view information about and control one or more devices, objects, and/or points within the management system 100. The graphical user interface 230 also provides an interface that is customizable to present the information and the controls in an intuitive and user-modifiable manner.

Those of ordinary skill in the art will appreciate that the hardware depicted in FIG. 2 may vary for particular implementations. For example, other peripheral devices, such as an optical disk drive and the like, also may be used in addition to or in place of the hardware depicted. The depicted example is provided for the purpose of explanation only and is not meant to imply architectural limitations with respect to the present disclosure.

One of various commercial operating systems, such as a version of Microsoft Windows™, a product of Microsoft Corporation located in Redmond, Wash. may be employed if suitably modified. The operating system may be modified or created in accordance with the present disclosure as described, for example, to implement navigation of depths and layers for building automation graphics.

LAN/WAN/Wifi adapter 212 may be connected to a network 232, such as, for example, MLN 104 in FIG. 1. As further explained below, the network 232 may be any public or private data processing system network or combination of networks, as known to those of skill in the art, including the Internet. Data processing system 200 may communicate over network 232 to one or more computers, which are also not part of the data processing system 200, but may be implemented, for example, as a separate data processing system 200.

Figure 3:
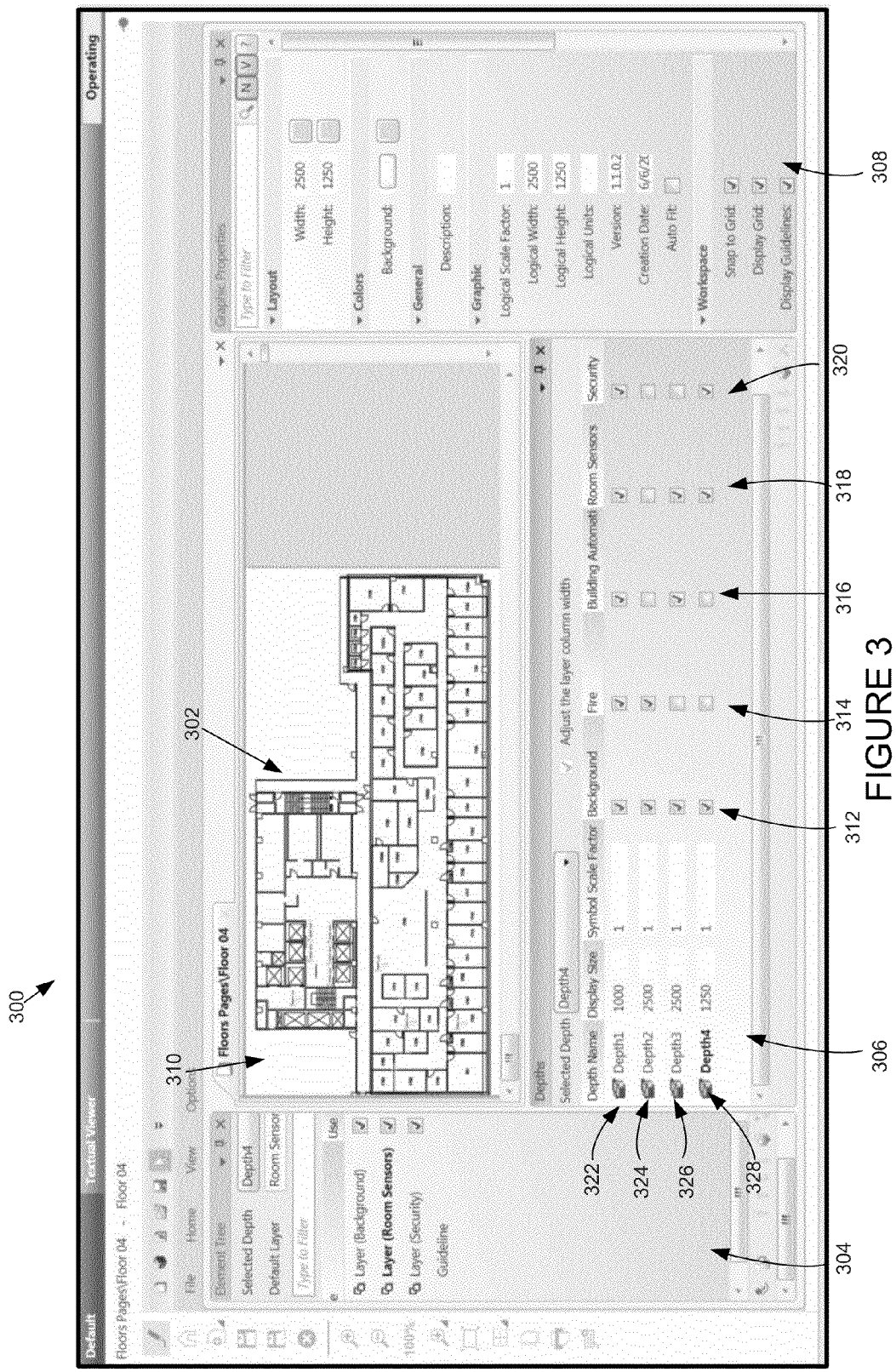
FIG. 3 illustrates a graphical user interface including a display of layers and depths of a graphic that may be defined by an operator using a graphics editor module of a system manager application when in an editor mode and displayed when in an operating mode in accordance with disclosed embodiments.

FIG. 3 illustrates a graphical user interface 300 including a display of layers and depths of a graphic that may be defined by an operator using a graphics editor module of a system manager application and displayed when in an operating mode in accordance with disclosed embodiments. The graphical user interface 300 is an example of one interface generated by the data processing system 200 and the system manager application 228. In this illustrative embodiment, the graphical user interface 300 comprises a multi-area or multi-pane display window displayed on a display device (e.g., display 211 in FIG. 2). The graphical user interface 300 includes a display of a building graphic 302 and a plurality of associated panes or windows 304-310. In this example, the building graphic 302 is a graphical representation of a floor of a building and is displayed in a first or primary pane or window 310. The plurality of windows 304-310 include one or more fields generated by the graphics editor module of the system manager application 228 when in an editor mode to enable an operator to edit and create different views of layers and depths of the building graphic 302 to be displayed in the window 310 during editor mode and when the system manager application 228 is switched to the operating mode. In the implementation shown in FIG. 3, the operator may change the graphics application to enter editing mode by clicking on the "pencil" toggle button in the vertical toolbar while the system manager is still in operating mode.

As used herein, layers are building blocks of larger graphics representing equipment, floors, buildings, facilities and entire campuses of buildings. Each layer of a graphic represents a grouping of graphical elements or system objects and has a name. Each layer may be assigned one discipline which corresponds to a property for associating layers of the same or different building graphic with the same function for display, such as HVAC discipline, Fire Safety discipline, or Security discipline or some functional combination thereof such as a discipline for displaying graphic elements associated with a building emergency evacuation route(s). In various embodiments of the present disclosure, layers may be combined and organized in different ways to create different desired views at a page level when the graphics editor module of the system manager application 228 is selectively switched to the operating mode. In the example illustrated in FIG. 3, the building graphic 302 has five layers. The layers are named background layer 312, fire layer 314, building automation layer 316, room sensors layer 318, and security layer 320. The background layer 312 includes the graphical elements or system objects for the building layout, e.g., floor and room dimensions, room numbers, room names, door openings, stairwells, etc. While in some embodiments, layers may be arranged by the disciplines, a layer may include objects from any number of different disciplines and an object may be included in any number of layers.

In this illustrative example, the fire layer 314 includes objects representing fire and other safety devices (e.g., safety devices 120) that are located in or in proximity to the building represented by building graphic 302 and under control of the management system 100. For example, without limitation, the fire layer 314 may include objects representing smoke alarms, fire alarms, gas detectors, etc. In this illustrative example, the building automation layer 316 includes objects representing building automation devices (e.g., building automation devices 116) that are located in or in proximity to the building represented by building graphic 302 and under control of the management system 100. For example, without limitation, the building automation layer 316 may include objects representing controllers, lights, digital thermostats, temperature sensors, fans, damper actuators, heaters, chillers, HVAC devices, etc.

In this illustrative example, the room sensors layer 318 includes objects representing sensor devices that are located in or in proximity to the building represented by building graphic 302 and under control of the management system 100. For example, without limitation, the room sensors layer 318 may include objects representing temperature sensors, motion sensors, glass-break sensors, security alarms, door/window sensors, etc. In this illustrative example, the security layer 320 includes objects representing security system devices (e.g., security devices 118) that are located in or in proximity to the building represented by building graphic 302 and under control of the management system 100. For example, without limitation, the security layer 320 may include objects representing controllers, cameras, lights, motion sensors, glass-break sensors, security alarms, door/window sensors, etc.

In the present disclosure, depths are one of the ways that layers may be combined and organized to present different desired views of components in the management system 100. Depths, as used herein, are a defined or logical grouping of one or more layers. In the example illustrated in FIG. 3, four depths 322-328 are present in the building graphic 302. In this illustrative example, each of the four depths 322-328 includes the background layer 312 (e.g., the graphics for the building layout) and at least one other layer. For example, depth 322 ("Depth 1") includes all the layers 312-320. This grouping of layers may be advantageous in situations where a building manager desires to have a general view of each of the layers. In another example, depth 324 ("Depth 2") includes the background layer 312 and the fire layer 314. This grouping of layers may be advantageous in situations where a building manager desires to be able to view and monitor fire system objects on a floor of the building without objects from other systems cluttering the view of the floor. In the example shown in FIG. 3, depth 326 ("Depth 3") includes the background layer 312, the building automation layer 316 and the room sensors layer 318. This grouping of layers may be advantageous in situations where a building manager desires to be able to view and monitor building automation system objects and associated sensor objects on a floor of the building (e.g., to resolve an HVAC performance alarm) without objects from other systems cluttering the view of the floor. In yet another example, depth 328 ("Depth 4") includes the background layer 312, the room sensors layer 318, and the security layer 320. This grouping of layers may be advantageous in situations where a building manager desires to be able to view and monitor security system objects and associated sensor objects on a floor of the building without objects from other systems cluttering the view of the floor.

The graphics editor module of the system manager application 122 or 228 enables a user or operator to select and deselect layers to be included in a depth using the check boxes in window 306. The graphics editor module of the system manager application 122 or 228 also enables the user to define a display size for each depth. For example, in window 308, the graphics editor module of the system manager application 122 or 228 displays in window 308 user definable properties (including layout height and width of the building graphic 302; in this example, the building graphic has a layout width of 2500. However, using the graphics editor module, the user or operator has set the display size for depth 328 is set at 1250 as reflected in the window 306. Thus, when the graphics editor module is in the operating mode and commanded to display the building graphic 302 at Depth 4 (i.e., depth 328), the graphics editor module of the system manager application will set the a zoom factor for Depth 4 or depth 328 to be 200 percent based on the display size (e.g., 1250) associated with Depth 4 relative to the width (e.g., 2500) of the background layer defined for the respective building graphic 302.

The illustration of the graphical user interface 300 in FIG. 3 is intended as an illustrative example of one embodiment of the present disclosure and not meant to imply physical or architectural limitations to the manner in which different illustrative embodiments may be implemented. For example, any number of windows may be present in the graphical user interface 300. In other examples, any number of depths and/or layers may be present in the building graphic 302.

Figure 4:
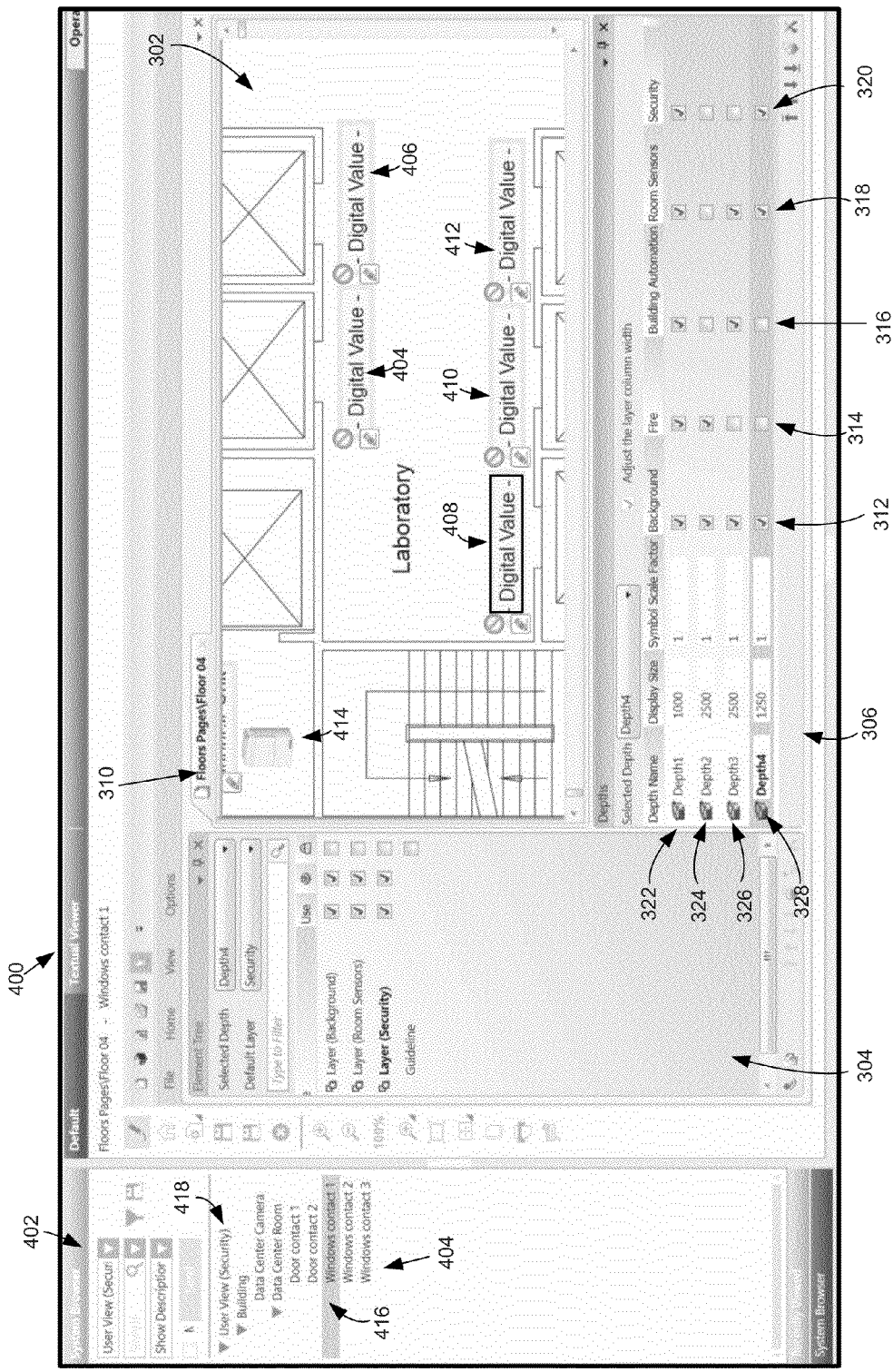
FIG. 4 illustrates an exemplary screen capture of the graphical user interface for editing layers and depths of a graphic generated using the system manager application in accordance with disclosed embodiments.

FIG. 4 illustrates an exemplary screen capture of editing layers and depths of a graphic generated using the system manager application in accordance with disclosed embodiments. In this illustrative embodiment, the graphical user interface 400 in FIG. 4 is an example of the graphical user interface 300 in an editor mode. For example, the graphical user interface 400 is a display generated by the data processing system 200 while the system manager application 228 (and, in particular, the graphics editor module thereof) is in the editor mode. As noted above, when in the editor mode, the system manager application 228 enables a user to utilize the graphical user interface 400 to modify and define layers that are to be included in depths of a graphic 302 and objects that are included in the layers of the graphic 302.

The graphical user interface 400 includes a window 402 comprising a hierarchical structure 404 of objects associated with the building graphic 302. In this illustrative example, hierarchical structure 404 comprises identifiers of objects (corresponding to devices 116, 118 and/or 120 of the management system 100) that are associated with or present in the selected depth 328 ("Depth 4"). As depicted, depth 328 ("Depth 4") includes the background layer 312, the room sensors layer 318, and the security layer 320. For example, objects corresponding to certain sensors located in the building (e.g., certain BAS devices 116, security devices 118, or safety devices 120 corresponding to sensors) and defined to be included in the room sensor layer 318 of the respective building graphic 302 are displayed in the window 310 by the system manager application 122 or 228 as six symbols 404-414. In this example, five of the symbols 404-412 graphically represent door/window contacts sensors and a symbol 414 represents a temperature sensor each located within the building as reflected by the respective symbol 404-412 displayed in associated with the building graphic 302. In particular, the object identifier "windows contact 1" 416 in the hierarchical structure 404 is uniquely associated with the symbol 408 in the building graphic 302. Because the graphics editor module or application being hosted by the system manager application 228 is in the editor mode, current values for the objects represented by the symbols 404-412 are not displayed in the window 310. Rather, generic text (e.g., "Digital Value") is displayed as the graphical representation of the state of the door/window contacts represented by symbols 404-412 in the building graphic 302.

In this illustrative example, that the security layer 320 is the default layer. As a result, dragging the object identifier "windows contact 1" 416 from the system browser in the window 402 dropping onto the building graphic 302 adds the symbol 408 to the default layer, in this example, the security layer 320 and not the background layer 312 or any other layer. The security layer 320 is the default layer is the default layer as shown in the listing of the identifier (Security) 418 in the system browser in the window 402.

Figure 5:
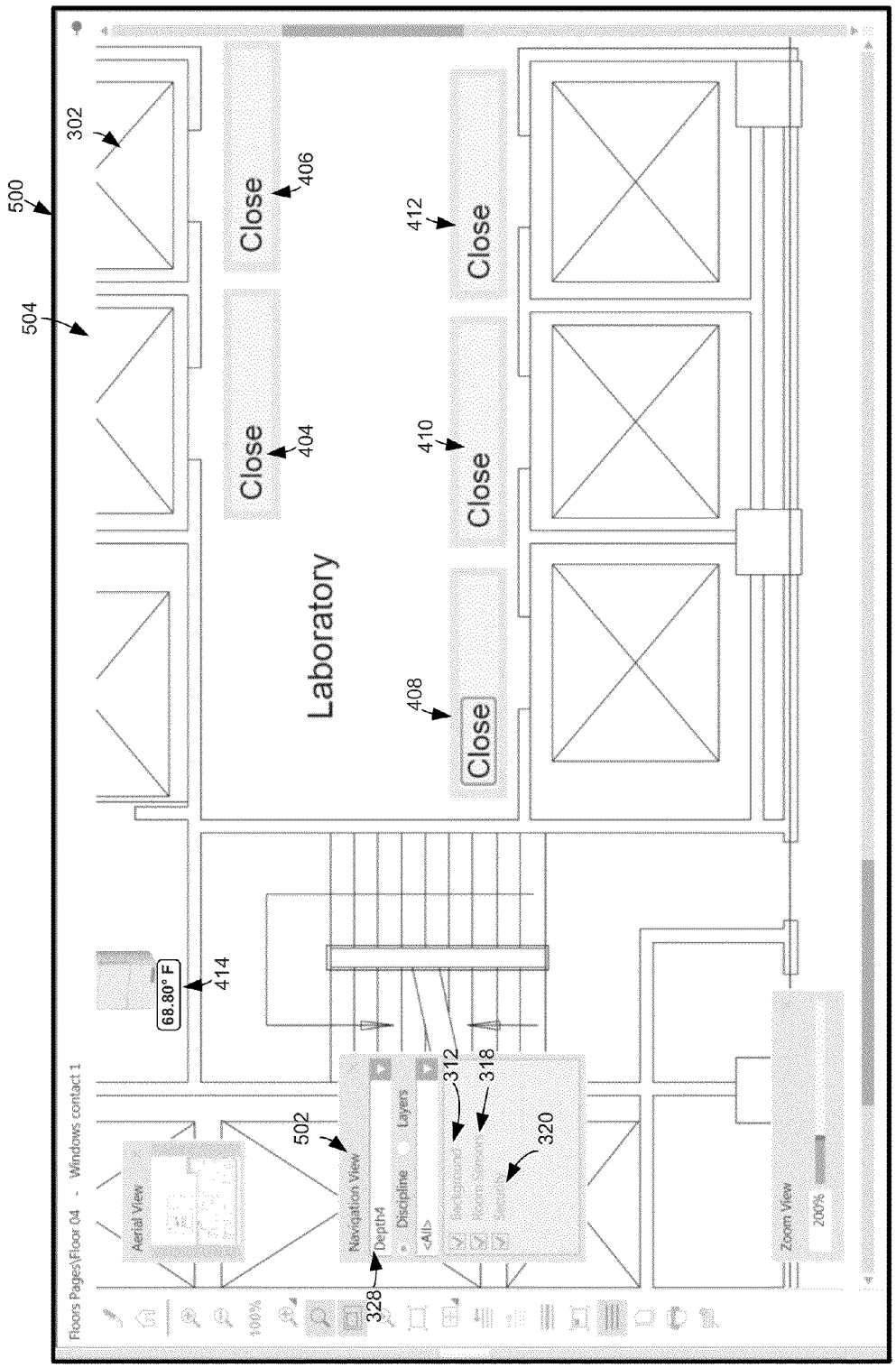
FIG. 5 illustrates an exemplary screen capture of a display of one depth of a graphic generated using the system manager application in accordance with disclosed embodiments.

FIG. 5 illustrates an exemplary screen capture of a display of one depth of a graphic generated using the system manager application in accordance with disclosed embodiments. In this illustrative embodiment, the graphical user interface 500 in FIG. 5 is an example of the graphical user interface 300 in a runtime or operating mode. For example, the graphical user interface 500 is a display generated by the data processing system 200 while the system manager application 228 is in the runtime or operating mode. The runtime or operating mode is an active display mode displaying the building graphics 302 as well as a graphical representation of a state of one or more devices 116, 118 and 120 (or objects corresponding to such devices) in the building represented by symbols in the building graphic 302. For example, the runtime mode allows a building manager to view and monitor information about system objects corresponding to devices 116, 118, and 120 on a floor of a building.

The graphical user interface 500 for the runtime mode includes a navigation view menu 502. The navigation view menu 502 is a part of the graphical user interface 500 that may be used to navigate a filter through the building graphic 302 using layers and depths. For example, once the layers and depths are configured or defined for a graphic 302 as described herein, navigation view menu 502 may be used to navigate through views of the active graphic (e.g., the building graphic 302) by selecting a depth and then filtering, by discipline (e.g., building automation devices 116, security devices 118, and/or the safety devices 120) or by layer, which of the associated layers to display. When the layers are filtered by discipline, only the layers designated with that discipline are displayed by the system manager application in the primary display window 504. Otherwise, if layers are filtered by layers only, all the layers of the selected depth are displayed by the system manager application in the primary display window 504. Additionally, the system manager application enables a user to manually select which layers (e.g., check/uncheck boxes for the layers in the navigation view menu 502) will be visible in the current display window 504.

In this illustrative example, depth 328 ("Depth 4") is selected in navigation view menu 502. As described above, depth 328 ("Depth 4") includes the background layer 312, the room sensors layer 318, and the security layer 320 and is displayed at a 200 percent zoom factor by the system manager application 122 or 228. As depicted, in the runtime mode, graphical representations of the current values for the states of the devices 116, 118, and 120 (or corresponding objects thereof) represented by the symbols 404-414 are displayed in association with the symbols 404-414. For example, for the window/door contact sensors represented by symbols 404-412, the state of the window/door contact sensors is represented as "Close" indicating to a viewer of graphical user interface 500 that the windows and doors in the laboratory are closed. For example, the state of the windows and doors in the laboratory or room of the building graphically represented by the graphic 302 may be periodically received by the server data processing system 102, accessed by a workstation running the system manager application 122, and displayed in the graphical user interface 500 of a display of the workstation.

Also, as depicted, the state of the temperature sensor represented by symbol 414 is displayed in graphical user interface 500. The symbol 414 is displayed as a result of the object for the symbol 414 being associated with or in the room sensor layer 318 selected to be included in the depth 328 ("Depth 4"). In this illustrative example, a temperature value of 68.8° is displayed next to the symbol 414 graphically depicting the temperature sensor in the building represented by the building graphic 302. As a result, a viewer of graphical user interface 500 may identify and monitor the temperature in the room where the temperature sensor is located. In this illustrative example, the graphical representation of the state of a device is shown as a text value. However, in other embodiments, the graphical representation of the state of a device may be shown as a different color, shape, size of the symbol and/or any other type of graphical representation to indicate the present state of the device.

Figure 6:
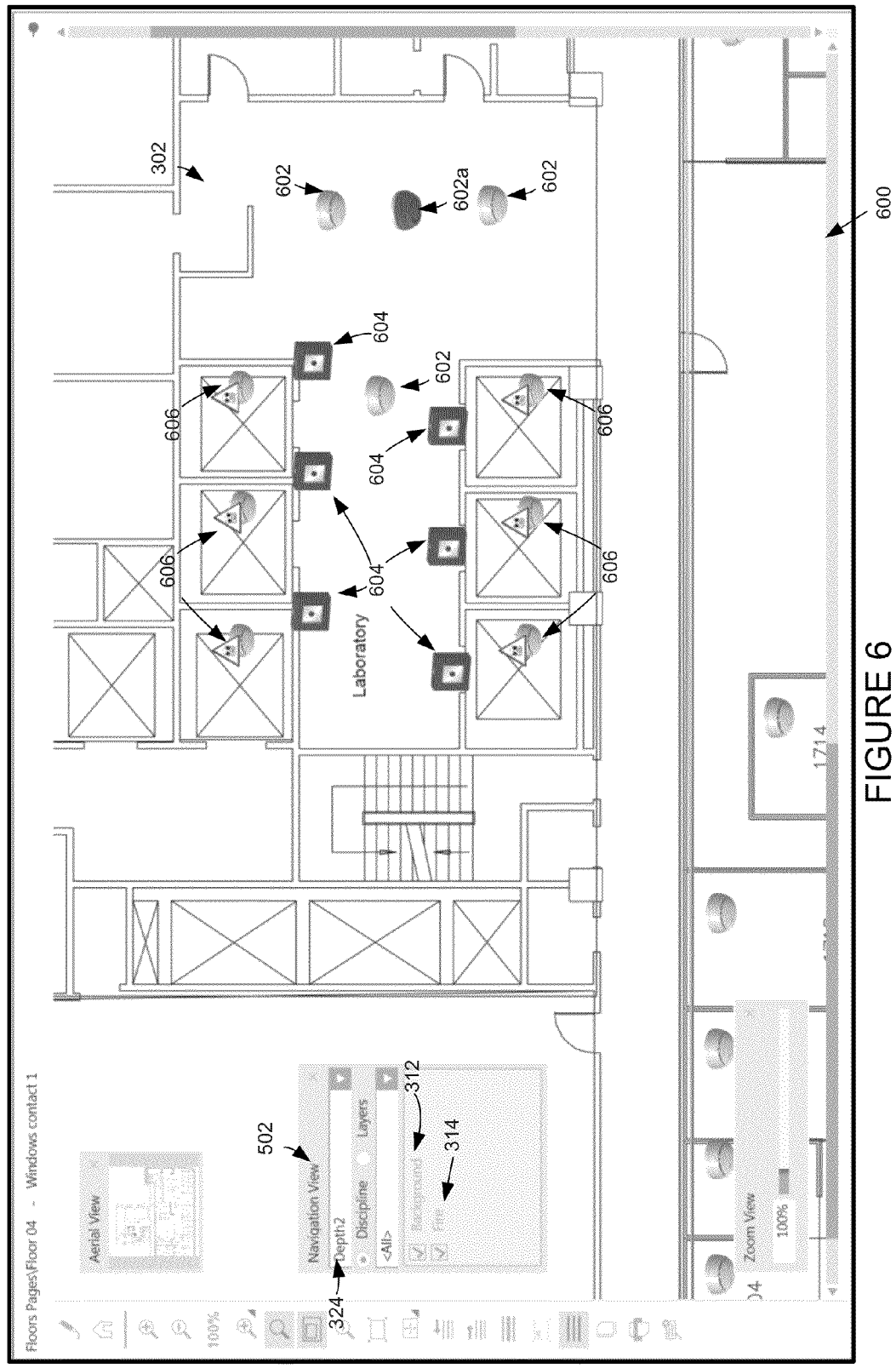
FIG. 6 illustrates an exemplary screen capture of a display of another depth of a graphic generated using the system manager application in accordance with disclosed embodiments.

FIG. 6 illustrates an exemplary screen capture of a display of another depth of a graphic generated using the system manager application in accordance with disclosed embodiments. In this illustrative embodiment, the graphical user interface 600 in FIG. 6 is an example of the graphical user interface 300 in the runtime or operating mode. For example, the graphical user interface 600 is a display generated by the data processing system 200 while the system manager application 228 is in the runtime mode. In this illustrative example, depth 324 ("Depth 2") is selected in the navigation view menu 502 to be displayed in the graphical user interface 600. As described above, depth 324 ("Depth 2") includes the background layer 312 and the fire layer 314 and is displayed by the system manager application at a 100 percent zoom factor. As depicted, the fire layer 318 includes or is associated with objects represented by smoke detector symbols 602, fire alarm symbols 604, and gas detector symbols 606.

In the runtime mode, graphical user interface 600 includes graphical representations of the current values for the states of the devices represented by the symbols 602-606 displayed by the system manager application in association with the symbols 602-606. In this illustrative example, smoke detector symbol 602a is displayed as a darker color indicating that the smoke detector in the building is in an alarm signaling state. For example, the smoke detector (e.g., one of the safety devices 120) represented by smoke detector symbol 602a has detected smoke. The server data processing system 102 receives this status of the smoke detector from the safety system 112. The workstation on which the system manager application is hosted and the graphical user interface 600 is displayed then displays smoke detector symbol 602a as a different color than the standard color for the smoke detector symbols 602, such as, for example, as a red color as opposed to a grey color. This change in color indicates to a viewer that the smoke detector in the building is in an alarm signaling state.

Figure 7:
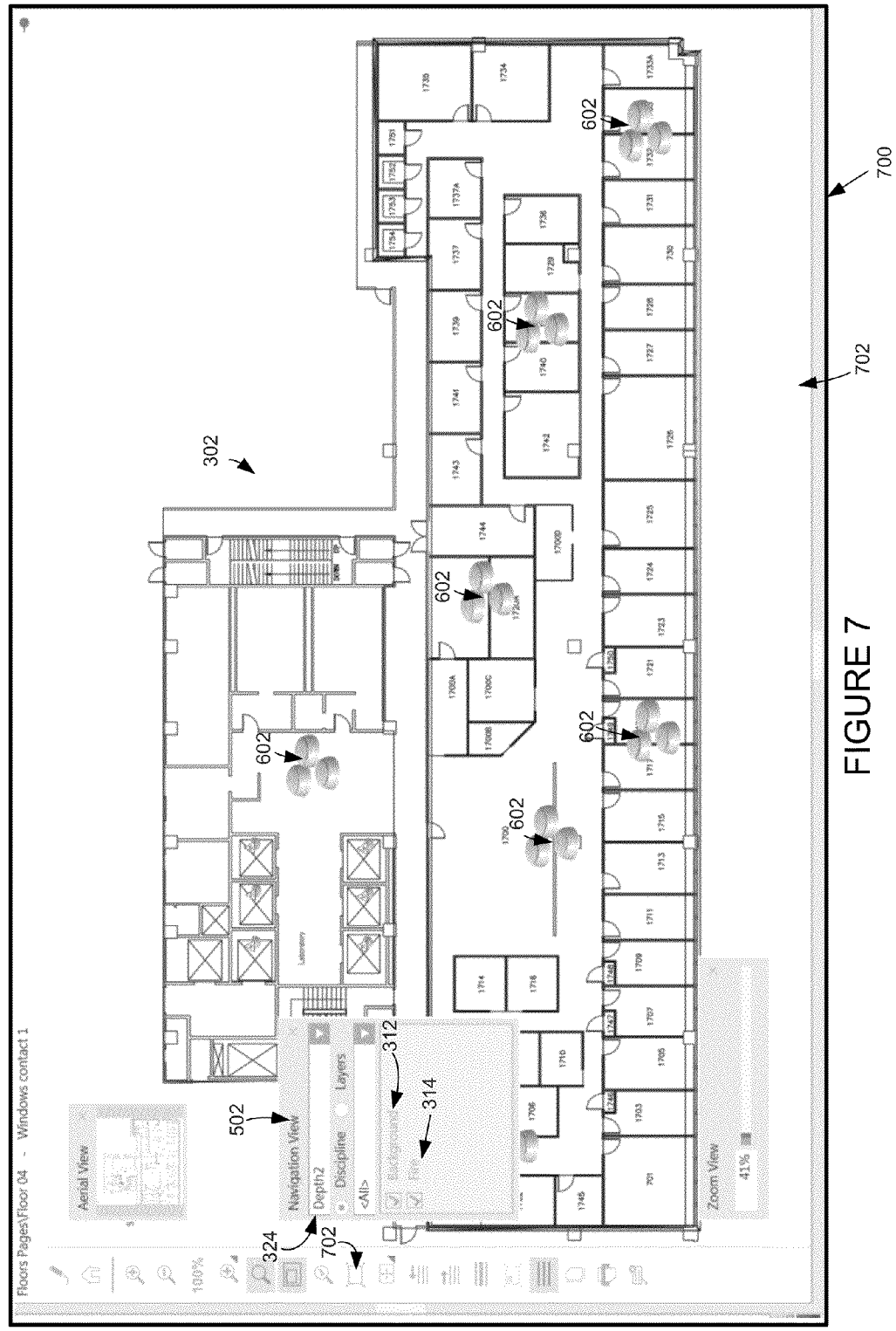
FIG. 7 illustrates an exemplary screen capture of the graphical user interface where symbols corresponding to objects or devices within a building are displayed in association with a building graphic using the system manager application in accordance with disclosed embodiments.

FIG. 7 illustrates an exemplary screen capture of the graphical user interface where symbols corresponding to objects or devices within a building are displayed in association with a building graphic using the system manager application in accordance with disclosed embodiments. In this illustrative embodiment, the graphical user interface 700 in FIG. 7 is an example of the graphical user interface 300 in a runtime mode. For example, the graphical user interface 700 is a display generated by the data processing system 200 while the system manager application 228 is in the runtime mode.

In this illustrative example, similar to the illustration of graphical user interface 600 in FIG. 6, depth 324 ("Depth 2") is selected in navigation view menu 502 to be displayed in the graphical user interface 600. However, unlike the illustration of graphical user interface 600 in FIG. 6, the zoom factor is set to 41 percent. For example, a user may have selected the display of depth 324 ("Depth 2") and then selected the a "Scale to Fit" button 702 to signal to the system manager application 122 or 228 to resize the display of building graphic 302 to fit into available space inside of window 704 of the graphical user interface 302, which resulted in a zoom factor of 41%. In this example, when the system manager application 228 is in the runtime mode, the data processing system 200 displays the graphical user interface 700 such that the entire building graphic (e.g., the floor of the building) is viewable in the display. Also, as compared to the illustration of graphical user interface 600 in FIG. 6, the graphical user interface 700 may not include a display of all of the objects that are present in or associated with the selected layers of the building graphic 302. For example, only some of the smoke detector symbols 602 are visible in the graphical user interface 700.

In these illustrative embodiments, the data processing system 200 determines whether the objects in the layers of the selected depth 324 ("Depth 2") should be displayed based on the visibility of the object. Each object has an associated zoom threshold. The zoom threshold is a value that is used to determine whether a symbol for an object will be visible in a display of a depth including the object. Various embodiments of the present disclosure utilize the zoom threshold of an object to adapt the display of objects to the particular view displayed. For example, at a zoom factor of 41 percent, if the symbols for every object in the selected depth 324 ("Depth 2") were displayed, the graphical user interface 700 may be overly cluttered with symbols such that important information may be missed. As the zoom factor increases, the amount of the currently displayed building graphic decreases and the availability of space in the graphical user interface 700 for displaying additional symbols increases.

Figure 8:
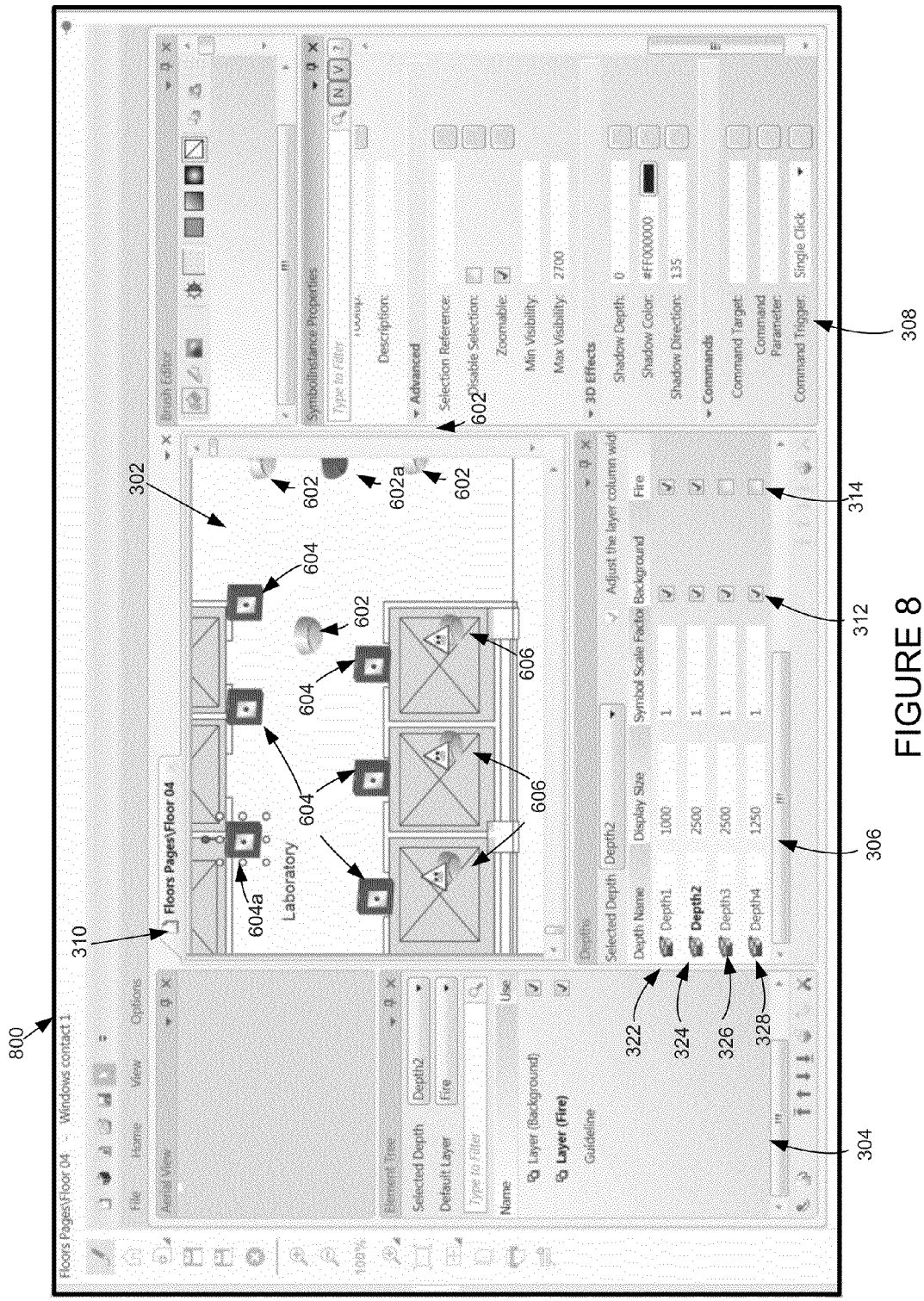
FIG. 8 illustrates an exemplary screen capture of the graphical user interface for editing the visibility of a symbol by the system manager application in accordance with disclosed embodiments.

FIG. 8 illustrates an exemplary screen capture of the graphical user interface for editing the visibility of a symbol by the system manager application in accordance with disclosed embodiments. In this illustrative embodiment, the graphical user interface 800 in FIG. 8 is an example of the graphical user interface 300 in an editor mode. For example, the graphical user interface 800 is a display generated by the data processing system 200 while the system manager application 228 is in the editor mode.

In this illustrative example, fire alarm symbol 604a has been selected, and the properties of the object represented by the fire alarm symbol 604a may be edited in the window 308. For example, a user may edit the maximum visibility and minimum visibility of the object represented by the fire alarm symbol 604a. The maximum visibility and minimum visibility are properties of an object used by the data processing system 200 to determine at what zoom factors the symbol 604a associated with the object will be present or displayed in association with the corresponding building graphic 302 by the data processing system 200 when the system manager application 228 is in the runtime mode. For example, as an operator uses the graphical user interface to increase the zoom factor for the active building graphic 302, the data processing system 200 uses the maximum visibility property assigned to the symbol to determine when the symbol will appear and the minimum visibility to determine when the symbol will disappear (i.e., zoomed in too far to see).

In these illustrative embodiments, the data processing system 200 calculates whether each symbol for an object will be visible in the presently-displayed or active graphic 302. For example, the data processing system 200 identifies each object in or associated with the layers in the selected depth and the current zoom factor. The data processing system 200 calculates the zoom threshold for each identified object in the selected areas. The zoom threshold for the object is the point at which the symbol is visible in a display of the corresponding active graphic 302. In this example, the maximum visibility for the fire alarm symbol 604a is set to 2700. As discussed above with regard to FIG. 3, the size of the building graphic is 2500. Thus, the zoom threshold for the object (i.e., the point at which the symbol is visible in a display) is about 92 percent (i.e., 2500 divided by 2700). If the current zoom factor is greater than or equal to (i.e., not less than) the zoom threshold, the data processing system 200 determines that the symbol associated with the object is visible in the display of the active graphic 302.

For example, as illustrated in FIG. 6, at the zoom factor of 100 percent, the fire alarm symbol 604a is visible in the display of the active building graphic 302. However, as illustrated in FIG. 7, when the zoom factor is set to 41 percent and the zoom threshold of the fire alarm symbol 604a is 92 percent (less than the zoom factor), the fire alarm symbol 604a is not displayed.

Viewports

Various embodiments of the present disclosure provide graphic viewports of building graphics. As used herein, a graphic viewport is a defined rectangular sub-section of a graphic that may be viewed independently of the graphic (e.g., the active building graphic 302). The graphic viewport is a zoomed in and/or panned view of a larger graphic that allows a user to view specific detail related to the selected depth. For example, the relationship between a graphic and a graphic viewport may be that of a parent-child relationship. The main graphic is the parent, and the graphic viewport(s) are the children. The viewports may be saved as children of the main graphic in hierarchical structure for the main graphic. For example, the data processing system 200 may save and display saved viewports or identifiers for such viewports in the hierarchical structure 404 in the window 402 for the system browser. The present disclosure provides two methods for creating viewports: manual viewports and automatic viewports.

Figure 9:
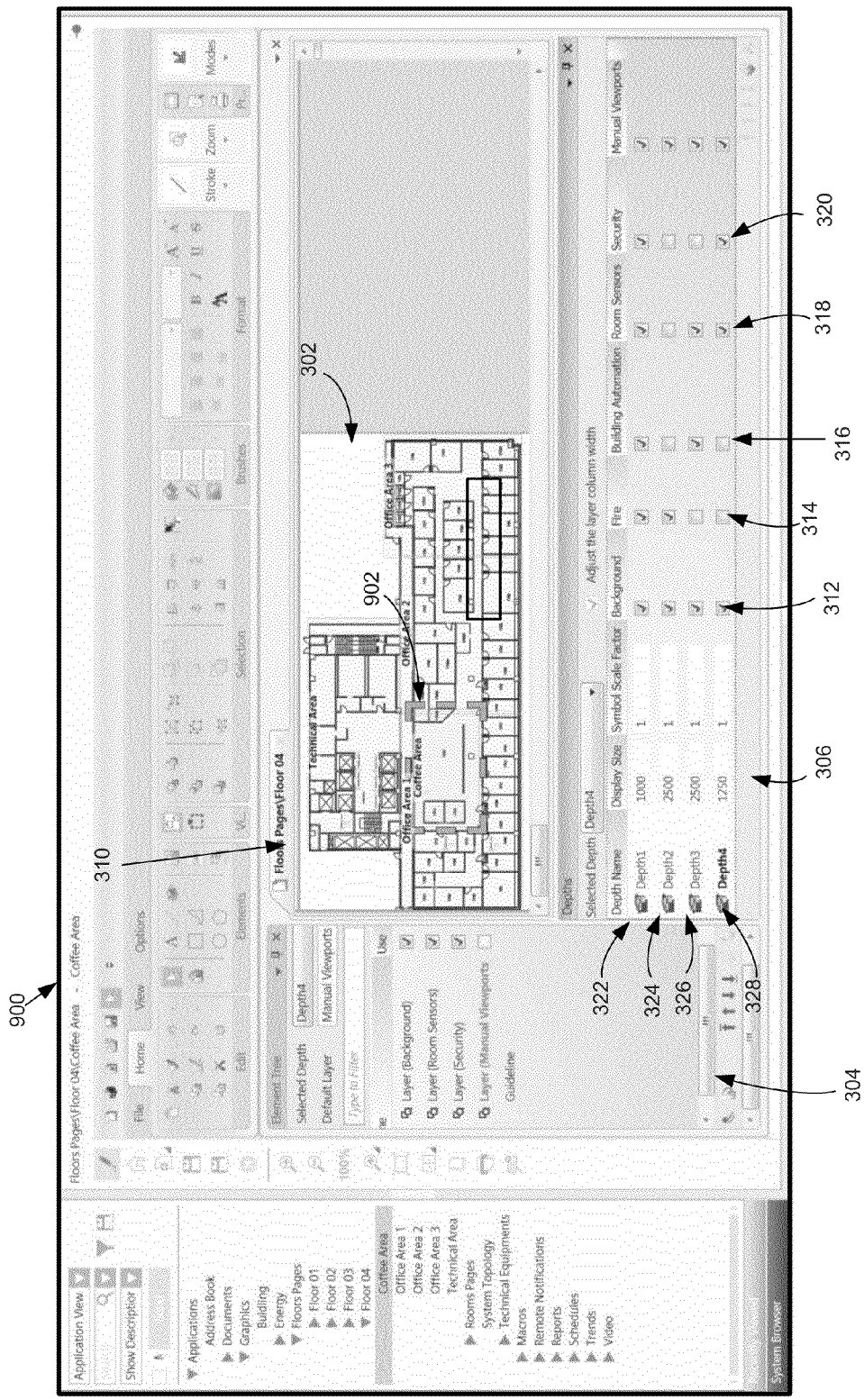
FIG. 9 illustrates an exemplary screen capture of the graphical user interface for capturing a manual viewport associated with a building graphic in accordance with disclosed embodiments.

FIG. 9 illustrates an exemplary screen capture of the graphical user interface for capturing a manual viewport associated with a graphic in accordance with disclosed embodiments. In this illustrative embodiment, the graphical user interface 900 in FIG. 9 is an example of the graphical user interface 300 in an editor mode. For example, the graphical user interface 900 is a display generated by the data processing system 200 while the system manager application 228 is in the editor mode.

In accordance with various embodiments of the present disclosure, manual viewports are created by selecting an area on the active graphic 302 in the work area of a graphical user interface. For example, the selected area 902 of the graphical user interface 900 is one example of creating a manual viewport. The data processing system 200 receives a user input in the form of selection of the area 902 (e.g., a selection of the building graphic 302 including the "Coffee Area"). For example, a user may drag and release a cursor of a mouse to define the selected area 902 of the displayed building graphic 302.

Figure 10:
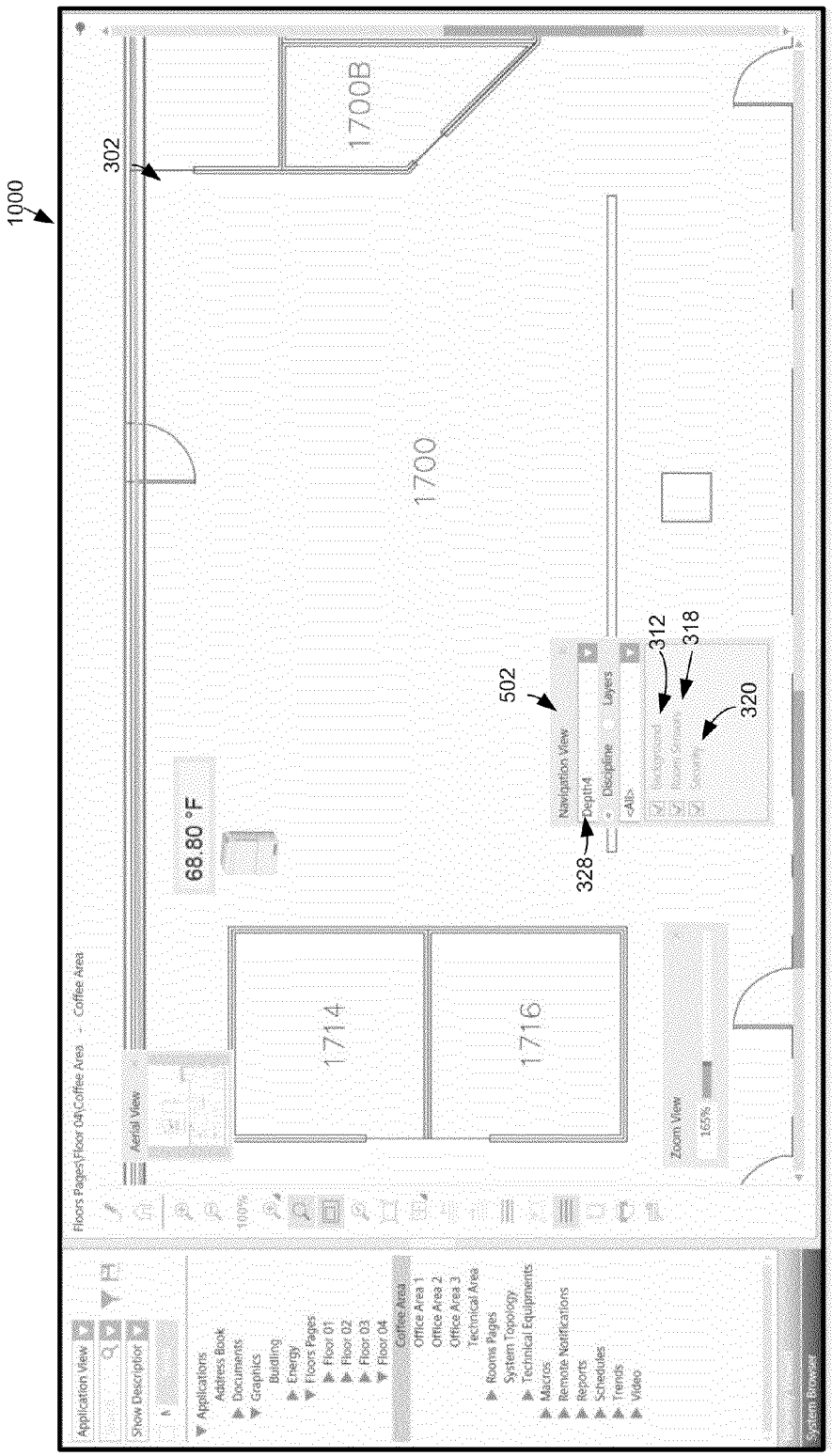
FIG. 10 illustrates an exemplary screen capture of the graphical user interface where a display is shown as generated by the system manager application of the manual viewport associated with and created from the building graphic illustrated in FIG. 9 in accordance with disclosed embodiments.

FIG. 10 illustrates an exemplary screen capture of the graphical user interface where a display is shown as generated by the system manager application of a manual viewport associated with and created from the building graphic 302 as illustrated in FIG. 9 in accordance with disclosed embodiments. In this illustrative embodiment, the graphical user interface 1000 in FIG. 10 is an example of the graphical user interface 900 in a runtime mode. For example, the graphical user interface 1000 is a display generated by the data processing system 200 while the system manager application 228 is in the runtime mode.

In this illustrative embodiment, the area 902 selected in graphical user interface 900 in FIG. 9 corresponds to the portions of the building graphic 302 displayed in the graphical user interface 1000 in FIG. 10. For example, when selected, the data processing system 200 may store the selected area 902 (having an identifier of "Coffee Area" in FIG. 10) as a manual viewport for the building graphic 302. When receiving a request to view the stored manual viewport (e.g., by selecting the corresponding identifier in the system browser window in FIG. 10), the data processing system 200 generates the display of the graphical user interface 1000 illustrated in FIG. 10 where the corresponding viewport of the active graphic 302 is displayed and scaled to fit the primary window of the graphical user interface 1000. Additionally, a user may associate data point objects with manually created viewports. For example, one or more objects (or symbols associated with such objects) may be set to be viewable in a manually-created viewport.

Figure 11:
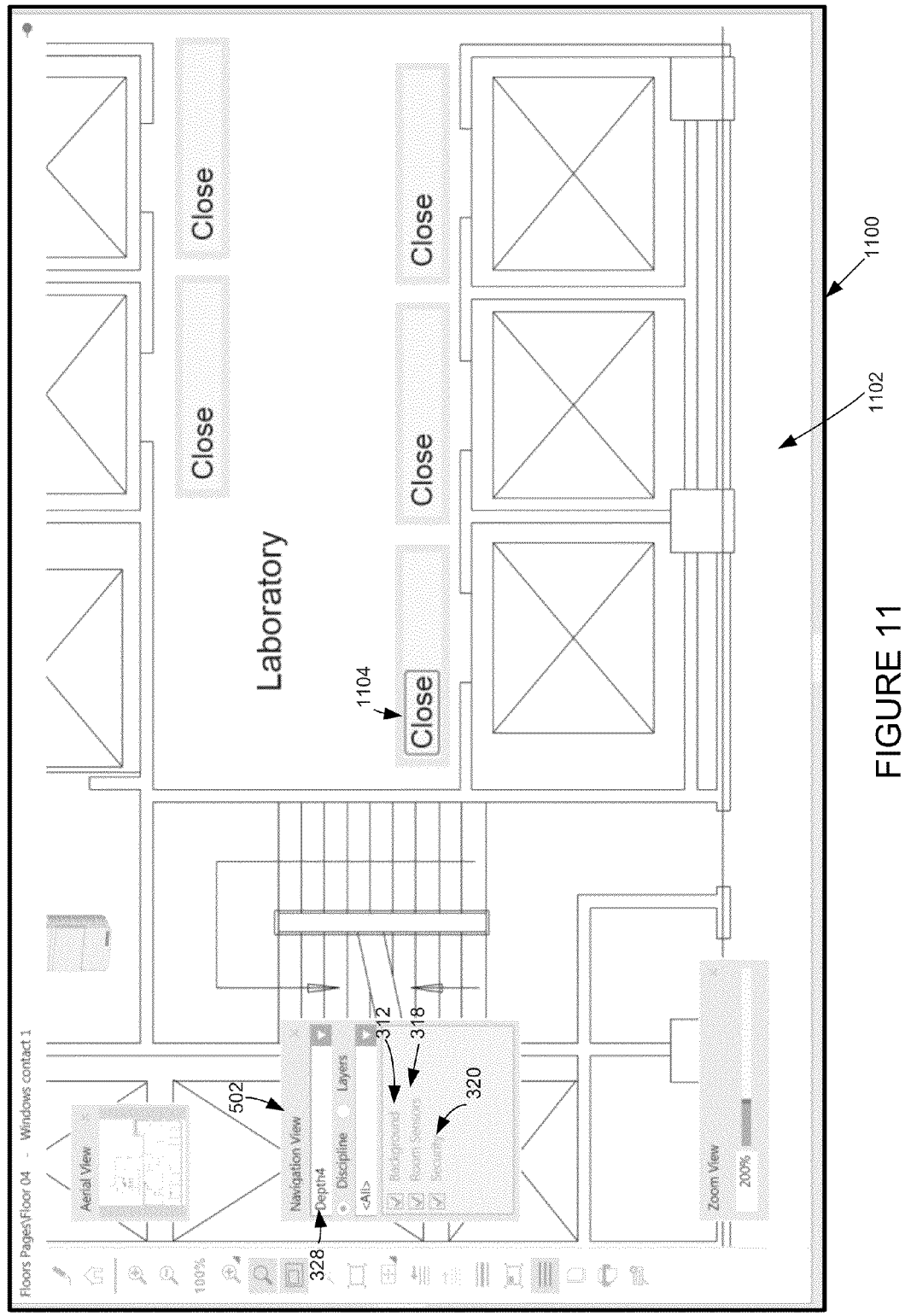
FIG. 11 illustrates an exemplary screen capture of the graphical user interface where one automatic viewport is shown as generated by the system manager application in accordance with disclosed embodiments.

FIG. 11 illustrates an exemplary screen capture of the graphical user interface where one automatic viewport is shown as generated by the system manager application in accordance with disclosed embodiments. In this illustrative embodiment, the graphical user interface 1100 in FIG. 11 is an example of the graphical user interface 300 in a runtime mode. For example, the graphical user interface 1100 is an automatic viewport 1102 of the building graphic 302 generated by the data processing system 200 while the system manager application 228 is in the runtime mode.

In various embodiments of the present disclosure, the data processing system 200 automatically calculates and creates viewports which are automatically created and based on existing system object references and symbols. For example, the data processing system 200 may generate an automatic viewport for each individual data point, symbol, or system object referenced on or associated with the graphic 302. The size of the automatic viewport is defined by the depth that contains the referenced object. The data processing system 200 may create the automatic viewport for each of the objects when the graphic is saved. The data processing system 200 generates the display of the automatic viewport in response to receiving a selection of the object via the selection of the corresponding symbol displayed in association with the graphic or the object identifier displayed in the system browser window.

For example, when the object identifier 416 (shown in FIG. 4) associated with the symbol 1104 is selected in the system browser, the data processing system 200 identifies the layer the object represented by symbol 1104 is located in and the depth the layer is associated with. In this illustrative example, referring back to FIG. 4, the symbol 408 (i.e., the symbol 1104 in runtime mode illustrated in FIG. 11) is a window contact sensor in the room sensor layer 318 in the depth 328 ("Depth 4"). The data processing system 200 identifies the zoom factor for the depth 328 (i.e., 200 percent) and the layers included in the depth 328 (i.e., the background layer 312, room sensor layer 318, and security layer 320). The data processing system 200 also determines whether the referenced object is related to other objects in the building graphic 302. For example, the data processing system 200 determines whether the referenced object has any siblings in a hierarchical structure of objects in the room sensor layer 318. In the exemplary embodiment illustrated in FIG. 11, the object represented by the symbol 1104 does not have siblings in a hierarchical structure of objects in the room sensor layer 318.

As depicted in FIG. 11 the selected symbol 1104 is selected and centered with the primary window as the center point for display of the corresponding building graphic 302. Additionally, the graphical user interface 1100 does not include any scrollbars because a point centering mode is enabled, as will be discussed in greater detail below.

Figure 12:
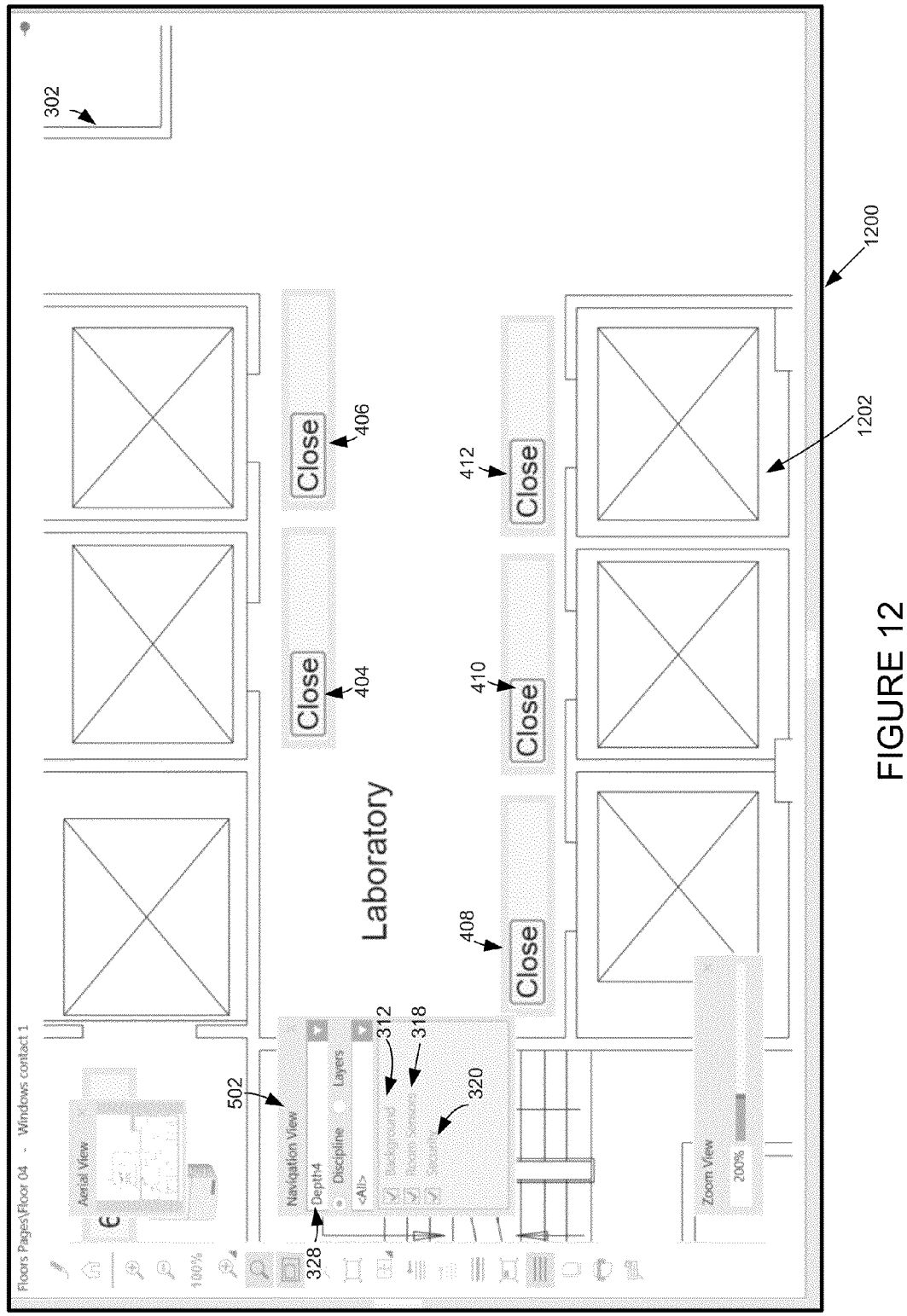
FIG. 12 illustrates an exemplary screen capture of the graphical user interface where another automatic viewport is shown as generated by the system manager application in accordance with disclosed embodiments.

FIG. 12 illustrates an exemplary screen capture of the graphical user interface where another automatic viewport is shown as generated by the system manager application in accordance with disclosed embodiments. In this illustrative embodiment, the graphical user interface 1200 in FIG. 12 is an example of the graphical user interface 300 in a runtime mode. For example, the graphical user interface 1200 displays the automatic viewport 1202 of the building graphic 302 generated by the data processing system 200 in the runtime mode. The automatic viewport 1202 is an example where the object represented by the selected symbol 408 in FIG. 4 is related to other objects in the building graphic 302.

For example, when the symbol 408 is selected in the building graphic 302 as shown in FIG. 4 or 5, the data processing system 200 identifies the layer the object represented by symbol 408 is located in and the depth the layer is associated with. In this illustrative example, referring back to FIG. 3 or 4 and similar to the illustration of FIG. 11, the symbol 408 is a window contact sensor in the room sensor layer 318 in the depth 328 ("Depth 4"). The data processing system 200 identifies the zoom factor for the depth 328 (i.e., 200 percent) and the layers included in the depth 328 (i.e., the background layer 312, room sensor layer 318, and security layer 320). The data processing system 200 also determines whether the referenced object is related to other objects in the building graphic 302, such as, for example, whether the referenced object has any siblings in a hierarchical structure of objects in the room sensor layer 318. The object represented by the symbol 408 has siblings in a hierarchical structure of objects in the room sensor layer 318. For example, as illustrated in FIG. 4, the hierarchical structure 404 includes four siblings of the object "windows contact 1" 416.

As depicted in FIG. 12, if the referenced object is related to other objects, the data processing system 200 generates the automatic viewport 1202 to include the layers of the depth the referenced object is in (i.e., the background layer 312, room sensor layer 318, and security layer 320) and centers the automatic viewport 1202 on the group of related symbols 404-412 within the primary window of the graphically user interface used for displaying a graphic. The data processing system 200 generates the automatic viewport 1202 to be displayed at a zoom factor calculated to include the group of related symbols 404-412 visible in the display. For example, if the related symbols 404-412 are relatively close together, the data processing system 200 may display the automatic viewport 1202 at the zoom factor of the depth or a larger zoom factor. If the related symbols 404-412 are farther apart, the data processing system 200 may display the automatic viewport at a lower zoom factor.

Centering Modes

Various embodiments of the present disclosure provide centering modes for ensuring that a selected point or group of points remains centered in a current viewport. For example, the centering modes of the present disclosure may be particularly advantageous when they are monitoring a fire system in a chemical manufacturing facility with key sensors that must always be viewed or when monitoring a security system in high security sites with key areas that must always be viewed. Enabling centered modes of the present disclosure in such a scenario ensures that the monitored sensor symbols do not blend in with and become lost among surrounding graphics.

The centering modes of the present disclosure include a point centering mode and a group centering mode. FIG. 11 illustrates an exemplary screen capture of centering or adjusting a center point of the display of a graphic within the primary window by the system manager application when in a point centering mode in accordance with disclosed embodiments. FIG. 12 illustrates an exemplary screen capture of centering or adjusting a center point of the display of a graphic within the primary window by the system manager application when in a group centering mode in accordance with disclosed embodiments.

As illustrated in FIG. 11, when a point is selected (e.g., symbol 1104), the data processing system 200 determines whether a centering mode is also selected. For example, a user may indicate a selection of point centering mode, group centering mode, and no centering mode in a graphics viewer toolbar of the graphical user interface 1100. If the point centering mode is selected, the data processing system 200 centers the viewport 1102 on the selected symbol 1104 within the primary window for displaying a graphic as illustrated in FIG. 11. The data processing system 200 may set the zoom factor based on the depth that includes the object represented by the selected symbol 1104. While in point centering mode, the data processing system 200 disables scrolling or panning in the viewport 1102 as shown by the lack of scroll bars in the graphical user interface 1100.

As illustrated in FIG. 12, if the group centering mode is selected, the data processing system 200 identifies one or more objects related to the object represented by the selected symbol 408. For example, as illustrated in FIG. 4, the hierarchical structure 404 includes four siblings of the object "windows contact 1" 416. The data processing system 200 selects the group of related symbols 404-412 and then centers the viewport 1202 on the group of related symbols 404-412 within the primary window for displaying a graphic as illustrated in FIG. 12. The data processing system 200 may set the zoom factor based on the depth that includes the group of related symbols 404-412 represented by the selected symbol 1104. While in point centering mode, the data processing system 200 disables scrolling or panning in the viewport 1202 as shown by the lack of scroll bars in the graphical user interface 1200.

Figure 13:
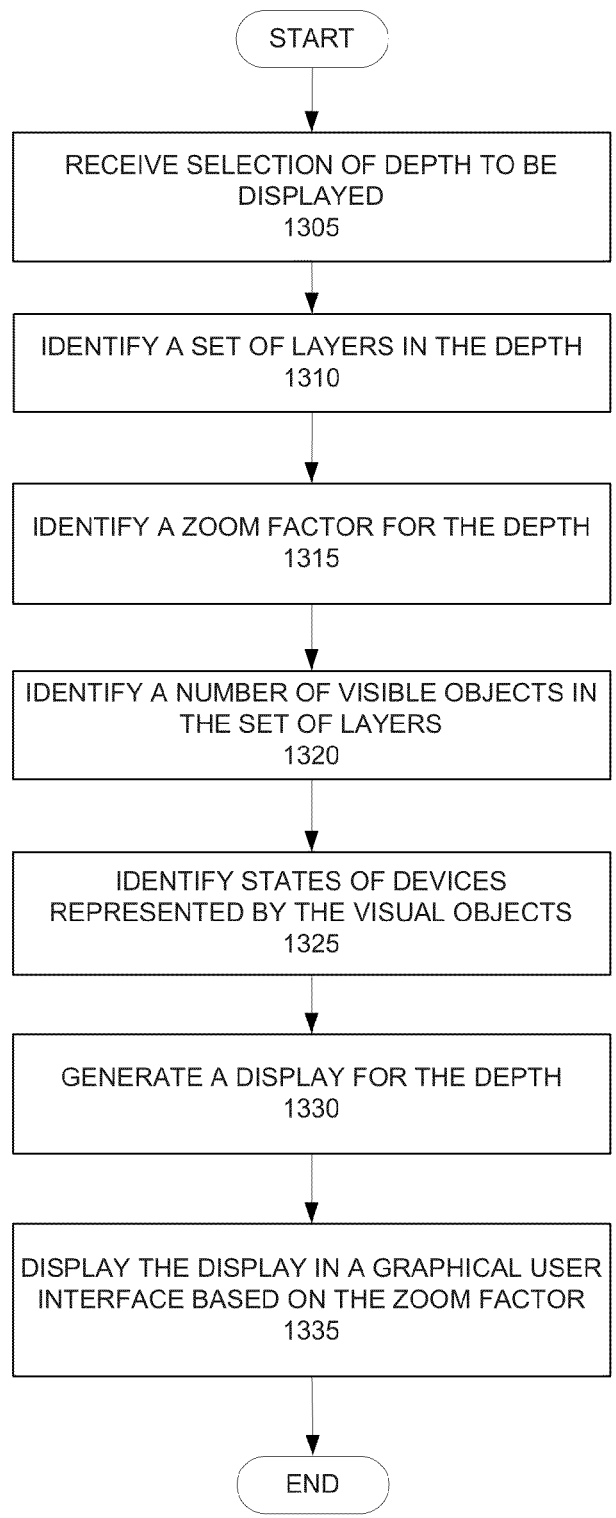
FIG. 13 illustrates a flowchart of a process in a management system for generating a display of a depth of a graphic in accordance with disclosed embodiments.

FIG. 13 depicts a flowchart of a process in a management system for generating a display of a depth of a graphic in accordance with disclosed embodiments. This process may be performed, for example, in one or more data processing systems, such as, for example, the data processing system 200, configured to perform acts described below, referred to in the singular as "the system." The process may be implemented by executable instructions stored in a non-transitory computer-readable medium that cause one or more data processing systems to perform such a process. For example, the system manager application 228 may comprise the executable instructions to cause one or more data processing systems to perform such a process.

The process begins with the system receiving a selection of depth of a graphic to be displayed (step 1305). The system identifies a set of layers in the depth (step 1310). In step 1310, the set of layers may be one or more of the layers 322-328 for the building graphic 302. The set of layers may include objects corresponding to devices (e.g., one or more of the devices 116-120) in a building managed by the management system 100.

The system identifies a zoom factor for the depth (step 1315). In step 1315, the zoom factor is specified for the depth. For example, the depth may have a preset display size while the building graphic has a graphic size. The system may calculate the zoom factor as the graphic size divided by the display size.

The system identifies a number of visible objects or symbols associated with such objects in the set of layers (step 1320). In step 1320, the system determines which objects or symbols associated with such objects in the set of layers will be visible based on the zoom factor for the depth. The system identifies states of devices represented by the visual objects (step 1325). In step 1325, the system may request and receive state information from one or more field panels, field controllers, and/or field operating in or in proximity to one or more buildings managed by the management system 100.

The system generates a display for the depth of the graphic (step 1330). In step 1330, the system generates the display to include the identified number of layers, a symbol for each of the number of visible objects in the identified number of layers based on the zoom factor visibility for the symbol associated with the respective object, and a graphical indication of the state of the device. For example, the system may generate this display for the depth of the graphic when the system manager application 122 is in runtime mode and a selection of the depth is received.

The system displays the generated display of the depth of the graphic in a graphical user interface based on the zoom factor (step 1335), with the process terminating thereafter. In step 1335, the system displays the graphic zoomed to the zoom factor of the depth. In illustrative examples, the system may display the graphic as the graphical user interface 500 illustrated in FIG. 5 or the graphical user interface 600 illustrated in FIG. 6 on the display 211 in FIG. 2.

Figure 14:
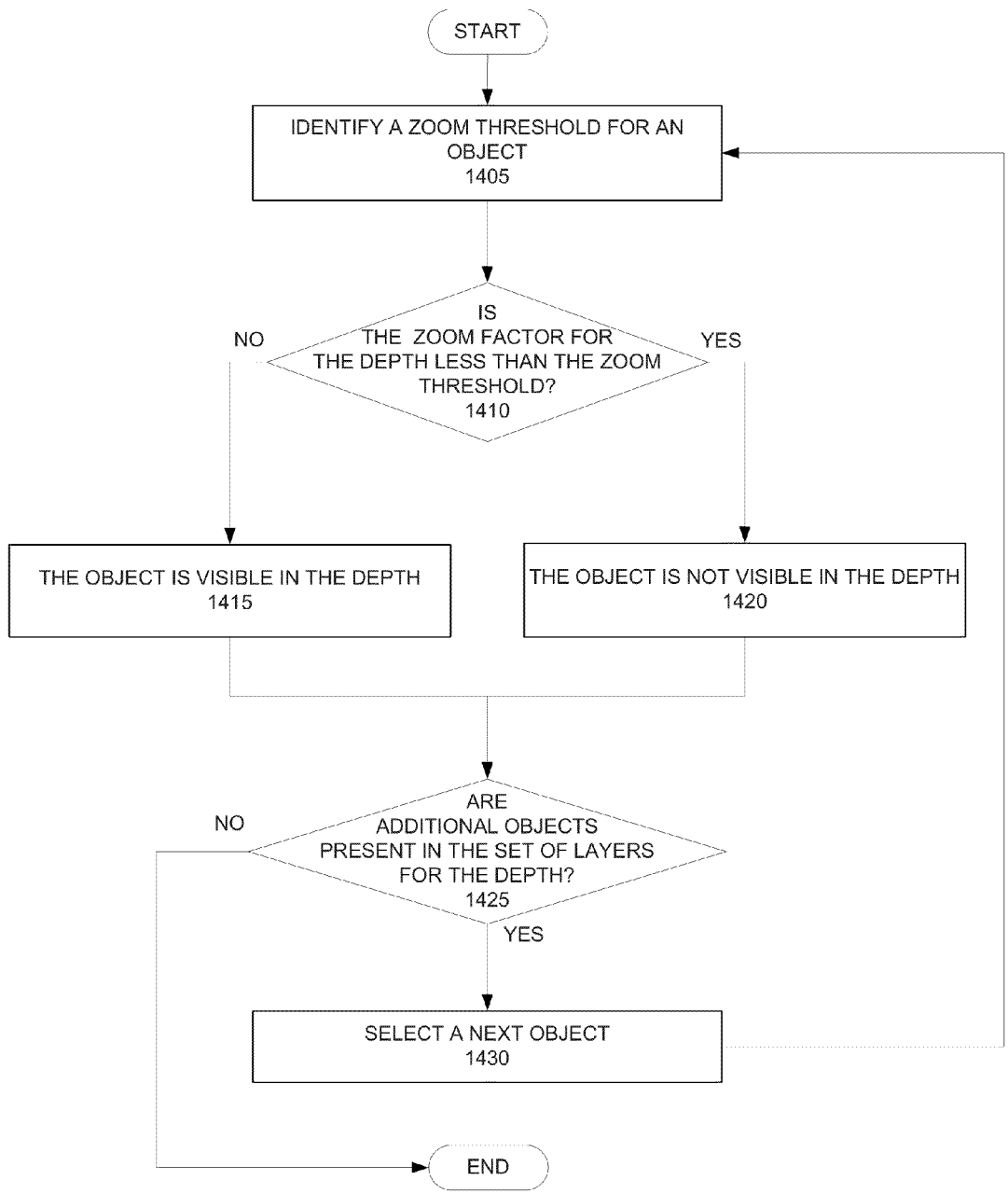
FIG. 14 illustrates a flowchart of a process in a management system for determining a visibility of objects in a depth of a graphic in accordance with disclosed embodiments.

FIG. 14 depicts a flowchart of a process for determining a visibility of objects in a depth of a graphic in accordance with disclosed embodiments. This process may be performed, for example, in one or more data processing systems, such as, for example, the data processing system 200, configured to perform acts described below, referred to in the singular as "the system." The process may be implemented by executable instructions stored in a non-transitory computer-readable medium that cause one or more data processing systems to perform such a process. For example, the system manager application 228 may comprise the executable instructions to cause one or more data processing systems to perform such a process. The process illustrated in FIG. 14 is one example of identifying a number of visible objects or symbols associated with such objects in the set of layers as described above with regard to step 1320 in FIG. 13.

The process begins with the system identifying a zoom threshold for an object or a symbol associated with such object (step 1405). In step 1405, the object or associated symbol may be one of the objects or object symbols in or associated with a layer that is to be displayed in a depth of a graphic. The system may identify the threshold for the object or associated symbol from stored parameters of the object.

The system determines whether the zoom factor for the depth of the graphic is less than the zoom threshold (step 1410). If the system determines that the zoom factor for the depth is not less than the zoom threshold, the system determines that the object or associated symbol is visible in the depth of the graphic that is to be displayed (step 1415). In step 1415, in other words, if the zoom factor is greater than or equal to (i.e., not less than) the zoom threshold, the object or associated symbol is visible in the depth of the graphic when displayed.

Returning to step 1410, if the system determines that the zoom factor for the depth is less than the zoom threshold, the system determines that the object or associated symbol is not visible in the depth (step 1420). In step 1420, in other words, if the zoom factor is not greater than or equal to (i.e., less than) the zoom threshold, the object or associated symbol is not visible in the depth.

The system then determines whether additional objects or symbols associated with such objects are present in or associated with the set of layers for the depth of the graphic (step 1425). In step 1425, the additional objects are objects that the system has yet to determine whether the objects or associated symbols are visible in the display of the depth. If the system determines that additional objects are present in or associated with the set of layers for the depth, the system selects a next object (step 1430) and returns to step 1405 to identify the zoom threshold for the selected object or the symbol associated with such object. In step 1430, the system may repeat this process for each object in the layers in the depth of the graphic to be displayed.

If the system determines that additional objects are not present in or associated with the set of layers for the depth, the system has identified the visibility of the objects or associated symbols in the depth and the number of objects or associated symbols that will be visible in the depth given the zoom factor for the depth. The process for determining the visibility of the objects in the depth terminates thereafter. The system may proceed with a process for generating a display of a depth of a graphic as described above in FIG. 13. For example, the system, having identified the number of visible objects or associated symbols in the set of layers (e.g., as in step 1320 in FIG. 13), may proceed to step 1325 in FIG. 13 to continue the process for generating a display of a depth in a management system.

Figure 15:
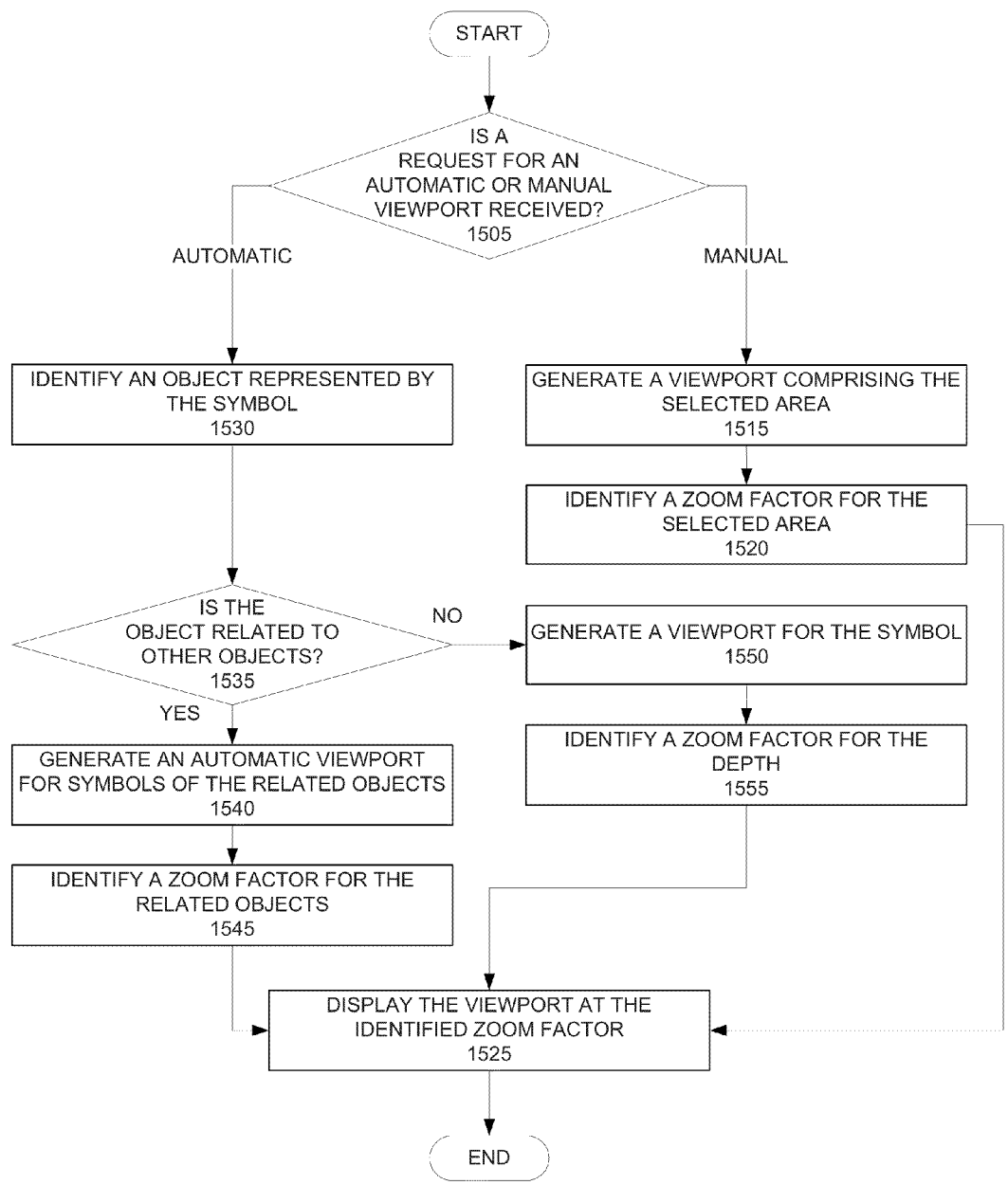
FIG. 15 illustrates a flowchart of a process in a management system for generating a display of a viewport of a graphic in accordance with disclosed embodiments.

FIG. 15 depicts a flowchart of a process in a management system for generating a display of a viewport of a graphic in accordance with disclosed embodiments. This process may be performed, for example, in one or more data processing systems, such as, for example, the data processing system 200, configured to perform acts described below, referred to in the singular as "the system." The process may be implemented by executable instructions stored in a non-transitory computer-readable medium that cause one or more data processing systems to perform such a process. For example, the system manager application 228 may comprise the executable instructions to cause one or more data processing systems to perform such a process.

The process begins with the system determining whether a request for an automatic or manual viewport is received (step 1505). For example, in step 1505, the system may receive a selection of a symbol displayed in a graphical user interface. If a symbol was selected, the system may determine that a request for an automatic viewport is received and will proceed to generate and display the automatic viewport as described below. In another example, if the system determines that an area of the displayed graphic was selected, the system may identify that a request for a manual viewport is received.

If the system determines that a request for a manual viewport is received, the system generates a viewport comprising the selected area (step 1515). In step 1515, the system determines that a manual viewport was selected by a user and identifies the size of the viewport based on the selected area.

The system identifies a zoom factor for the selected area (step 1520). In step 1520, the system calculates the zoom factor based on the selected area and the size of the corresponding graphic. The system displays the viewport at the identified zoom factor (step 1525), with the process for generating the display of the viewport in the management system terminating thereafter. In this scenario, the system has generated a manual viewport. In one illustrative example, the system may display the manual viewport within the primary window of the graphical user interface 600 for displaying a graphic as illustrated in FIG. 10 from the selected area 902 in the graphical user interface 900 illustrated in FIG. 9.

Returning to step 1505, if the system determines that a request for an automatic viewport is received, the system identifies an object represented by the symbol selected (step 1530). In step 1530, the system determines that an automatic viewport is requested to be displayed.

The system determines whether the object is related to other objects associated with the active graphic (step 1535). In step 1535, the system may determine whether the object has siblings in a hierarchical structure of the objects or object identifiers stored by the system. If the system determines that the object is related to other objects, the system generates an automatic viewport for symbols of the related objects (step 1540). In step 1540, the system generates the automatic viewport to include the symbols for the related objects and to be centered on the symbols for the related objects within the primary window for displaying a graphic.

The system identifies a zoom factor for the related objects (step 1545). In step 1545, the system calculates the zoom factor such that the symbols for each of the related objects are viewable in the display. The system then proceeds to step 1525 to display the automatic viewport at the zoom factor for the related objects. In one illustrative example, the system may display the automatic viewport for the group of related objects within the primary window of the graphical user interface 1200 as illustrated in FIG. 12.

Returning to step 1535, if the system determines that the object is not related to other objects, the system generates a viewport for the symbol (step 1550). In step 1550, the system generates the automatic viewport to be centered on the selected symbol within the primary window for displaying a graphic.

The system then identifies a zoom factor for the depth (step 1555). In step 1555, the system may identify the zoom factor as the zoom factor for the depth that includes the layer that includes the object represented by the selected symbol. The system then proceeds to step 1525 and displays the automatic viewport at the zoom factor for the depth. In one illustrative example, the system may display the automatic viewport within the primary window of the graphical user interface 1100 as illustrated in FIG. 11.

Figure 16:
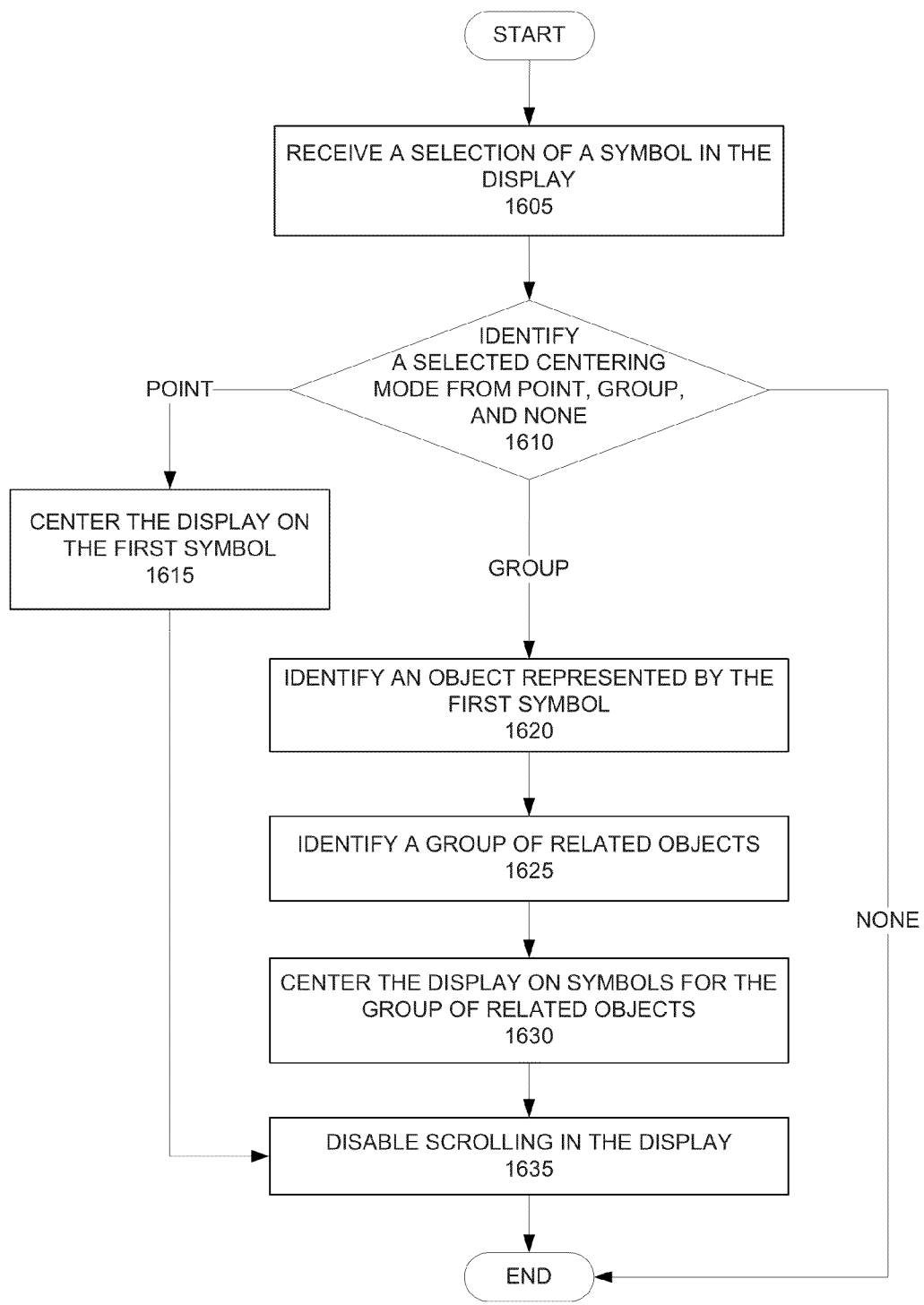
FIG. 16 illustrates a flowchart of a process in a management system for centering objects in a display of a graphic in accordance with disclosed embodiments.

FIG. 16 depicts a flowchart of a process in a management system for centering objects within a window for displaying a corresponding graphic in accordance with disclosed embodiments. This process may be performed, for example, in one or more data processing systems, such as, for example, the data processing system 200, configured to perform acts described below, referred to in the singular as "the system." The process may be implemented by executable instructions stored in a non-transitory computer-readable medium that cause one or more data processing systems to perform such a process. For example, the system manager application 228 may comprise the executable instructions to cause one or more data processing systems to perform such a process.

The process begins with the system receiving a selection of a symbol in the display of a graphic (step 1605). For example, in step 1605, the symbol may be a symbol displayed within a window of a graphical user interface on the display 211. In FIG. 2. The system identifies a selected centering mode from a point, a group, and none (step 1610). In step 1610, the system may identify the selected centering mode from a selection in a graphics viewer toolbar of the graphical user interface.

If the system determines that the selected mode is point centered mode, the system centers the display of the graphic on the first symbol (step 1615). In one illustrative example, the system may use the first symbol as the center point of the graphic displayed in the primary window of the graphical user interface 1100 as illustrated in FIG. 11. The system disables scrolling in the display (step 1635), with the process terminating thereafter.

Returning to step 1610, if the system determines that the selected mode is group centered mode, the system identifies an object represented by the first symbol (step 1620). In step 1620, a selected object or object identifier in the system browser of the graphical user interface is represented by the symbol associated with the graphic displayed in the primary window of the graphical user interface. The system identifies a group of related objects (step 1625). In step 1625, the system may determine whether the object has siblings in a hierarchical structure of the objects or object identifiers stored by the system.

The system centers the display of the graphic on symbols for the group of related objects (step 1630). In one illustrative example, the system may center the display of the graphic within the primary window of the graphical user interface 1200 as illustrated in FIG. 12. The system then proceeds to step 1635 and disables scrolling in the display, with the process terminating thereafter.

Returning to step 1610, if the system determines that no centering mode is selected, the system does not center the display and the process terminates thereafter.

Disclosed embodiments provide a grouping of layers of a management system in one or more different viewable depths and navigation and filtering of objects within the layers and depths. Disclosed embodiments provide for modification of a visibility of objects in a depth. Disclosed embodiments provide automatically generated and user definable viewports of various elements in a management system. Further, various embodiments of the present disclosure provide identification of related objects in a management system and a centered display of an object or group of related objects. With these disclosed features, embodiments of the present disclosure provide intuitive interface that allows for maneuvering among large numbers of objects and/or points in building automation systems.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 200 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method in a data processing system for generating a display of symbols for objects associated with a management system, the method comprising:
   identifying a set of layers and a zoom factor based on a depth of a graphic to be displayed, wherein the set of layers comprises symbols for objects corresponding to devices in a building managed by the management system;
   identifying a number of visible objects from the objects of the symbols in the identified set of layers based on the zoom factor;
   identifying a state of a device represented by a visual object in the number of visible objects from the management system communicably coupled with the devices; and
   generating a display for the depth, the display comprising the identified set of layers, a symbol for each of the number of visible objects in the identified set of layers, and a graphical indication of the state of the device.

2. The method of claim 1 further comprising:
   receiving a selection of the depth to be displayed from a user input comprising the selection; and
   displaying the display in a graphical user interface based on the zoom factor.

3. The method of claim 1 further comprising:
   identifying a location of the device in the building, wherein the devices comprise building automation devices, safety devices, and security devices;
   displaying a first symbol for the device in a position in the display corresponding to the location of the device in the building; and
   displaying the graphical indication of the state of the device in proximity to the first symbol for the device.

4. The method of claim 1, wherein identifying the number of visible objects from the objects of the symbols in the identified set of layers comprises:
   identifying a predefined zoom threshold for a first object of the objects of the symbols in the identified set of layers; and
   determining whether zoom factor for the depth is less than the predefined zoom threshold for the first object; and
   determining that the first object will be visible when the zoom factor is not less than the predefined zoom threshold.

5. The method of claim 1 further comprising:
   receiving a selection of a first symbol displayed in a graphical user interface;
   identifying an object represented by the first symbol; and
   identifying the depth to be displayed as the depth including the object.

6. The method of claim 5 further comprising:
   determining whether the object is related to at least one other object based on a hierarchical structure of the objects;
   generating a viewport in response to determining that the object is related to at least one other object, the viewport comprising the first symbol, a symbol for each of the at least one other object; and
   displaying the viewport at a zoom factor such that the first symbol and the symbol for each of the at least one other object are visible in the display.

7. The method of claim 5 further comprising:
   determining whether the object is related to at least one other object based on a hierarchical structure of the objects;
   generating a viewport for the first symbol that is centered on the first symbol in response to determining that the object is not related to at least one other object; and
   displaying the viewport based on the zoom factor for the depth.

8. The method of claim 1 further comprising:
   receiving a user input comprising a selection of an area of a graphical user interface;
   generating a viewport comprising the selected area of the graphical user interface; and
   displaying the viewport at a zoom factor based on a size of the selected area.

9. The method of claim 1 further comprising:
   receiving a selection of a first symbol displayed in a graphical user interface;
   identifying a centering mode selected; and
   centering the display based on the first symbol and disabling scrolling in the display in the graphical user interface in response to identifying that a point centered mode is selected.

10. The method of claim 1 further comprising:
    receiving a selection of a first symbol displayed in a graphical user interface;
    identifying an object represented by the first symbol;
    identifying a centering mode selected;
    identifying at least one other object related to the object based on a hierarchical structure of the objects to form a group of objects in response to identifying that a group centered mode is selected;
    centering the display on symbols for the group of objects; and
    disabling scrolling in the display.

11. A data processing system configured to generate a display associated with a management system, the data processing system comprising:
    a storage device comprising a system manager application;
    an accessible memory comprising instructions of the system manager application; and
    a processor configured to execute the instructions of the system manager application to:
       identify a set of layers and a zoom factor based on a depth of a graphic to be displayed, wherein the set of layers comprises symbols for objects corresponding to devices in a building managed by the management system;
       identify a number of visible objects from the objects of the symbols in the identified set of layers based on the zoom factor;
       identify a state of a device represented by a visual object in the number of visible objects from the management system communicably coupled with the devices; and
       generate a display for the depth, the display comprising the identified set of layers, a symbol for each of the number of visible objects in the identified set of layers, and a graphical indication of the state of the device.

12. The data processing system of claim 11, wherein the processor is further configured to execute the instructions of the system manager application to:
    receive a selection of the depth to be displayed from a user input comprising the selection; and
    display the display in a graphical user interface based on the zoom factor.

13. The data processing system of claim 11, wherein the processor is further configured to execute the instructions of the system manager application to:

identify a location of the device in the building, wherein the devices comprise building automation devices, safety devices, and security devices;

display a first symbol for the device in a position in the display corresponding to the location of the device in the building; and display the graphical indication of the state of the device in proximity to the first symbol for the device.

14. The data processing system of claim 11, wherein to identify the number of visible objects from the objects of the symbols in the identified set of layers the processor is further configured to execute the instructions of the system manager application to:

identify a predefined zoom threshold for a first object of the objects of the symbols in the identified set of layers; and determine whether zoom factor for the depth is less than the predefined zoom threshold for the first object; and determine that the first object will be visible when the zoom factor is not less than the predefined zoom threshold.

15. The data processing system of claim 11, wherein the processor is further configured to execute the instructions of the system manager application to:

receive a selection of a first symbol displayed in a graphical user interface;

identify an object represented by the first symbol; and identify the depth to be displayed as the depth including the object.

16. The data processing system of claim 15, wherein the processor is further configured to execute the instructions of the system manager application to:

determine whether the object is related to at least one other object based on a hierarchical structure of the objects;

generate a viewport in response to determining that the object is related to at least one other object, the viewport comprising the first symbol, a symbol for each of the at least one other object; and display the viewport at a zoom factor such that the first symbol and the symbol for each of the at least one other object are visible in the display.

17. The data processing system of claim 15, wherein the processor is further configured to execute the instructions of the system manager application to:

determine whether the object is related to at least one other object based on a hierarchical structure of the objects;

generate a viewport for the first symbol that is centered on the first symbol in response to determining that the object is not related to at least one other object; and display the viewport based on the zoom factor for the depth.

18. The data processing system of claim 11, wherein the processor is further configured to execute the instructions of the system manager application to:

receive a user input comprising a selection of an area of a graphical user interface;

generate a viewport comprising the selected area of the graphical user interface; and display the viewport at a zoom factor based on a size of the selected area.

19. The data processing system of claim 11, wherein the processor is further configured to execute the instructions of the system manager application to:

receive a selection of a first symbol displayed in a graphical user interface;

identify a centering mode selected; and center the display based on the first symbol and disabling scrolling in the display in the graphical user interface in response to identifying that a point centered mode is selected.

20. The data processing system of claim 11, wherein the processor is further configured to execute the instructions of the system manager application to:

receive a selection of a first symbol displayed in a graphical user interface;

identify an object represented by the first symbol;

identify a centering mode selected;

identify at least one other object related to the object based on a hierarchical structure of the objects to form a group of objects in response to identifying that a group centered mode is selected;

center the display on symbols for the group of objects; and disable scrolling in the display.

21. A non-transitory computer-readable medium encoded with executable instructions that, when executed by at least one processor, cause one or more data processing systems to:

identify a set of layers and a zoom factor based on a depth of a graphic to be displayed, wherein the set of layers comprises symbols for objects corresponding to devices in a building managed by the management system;

identify a number of visible objects from the objects of the symbols in the identified set of layers based on the zoom factor;

identify a state of a device represented by a visual object in the number of visible objects from the management system communicably coupled with the devices; and generate a display for the depth, the display comprising the identified set of layers, a symbol for each of the number of visible objects in the identified set of layers, and a graphical indication of the state of the device.

22. The computer-readable medium of claim 21, wherein the computer-readable medium is further encoded with executable instructions that, when executed by at least one processor, cause one or more data processing systems to:

receive a selection of the depth to be displayed from a user input comprising the selection; and display the display in a graphical user interface based on the zoom factor.

23. The computer-readable medium of claim 21, wherein the computer-readable medium is further encoded with executable instructions that, when executed by at least one processor, cause one or more data processing systems to:

identify a location of the device in the building, wherein the devices comprise building automation devices, safety devices, and security devices;

display a first symbol for the device in a position in the display corresponding to the location of the device in the building; and display the graphical indication of the state of the device in proximity to the first symbol for the device.

24. The computer-readable medium of claim 21, wherein the instructions that cause the one or more data processing systems to identify the number of visible objects from the objects of the symbols in the identified set of layers comprise instructions that cause the one or more data processing systems to:

identify a predefined zoom threshold for a first object of the objects of the symbols in the identified set of layers; and determine whether zoom factor for the depth is less than the predefined zoom threshold for the first object; and determine that the first object will be visible when the zoom factor is not less than the predefined zoom threshold.

25. The computer-readable medium of claim 21, wherein the computer-readable medium is further encoded with executable instructions that, when executed by at least one processor, cause one or more data processing systems to:
- receive a selection of a first symbol displayed in a graphical user interface;
- identify an object represented by the first symbol; and
- identify the depth to be displayed as the depth including the object.

26. The computer-readable medium of claim 25, wherein the computer-readable medium is further encoded with executable instructions that, when executed by at least one processor, cause one or more data processing systems to:
- determine whether the object is related to at least one other object based on a hierarchical structure of the objects;
- generate a viewport in response to determining that the object is related to at least one other object, the viewport comprising the first symbol, a symbol for each of the at least one other object; and
- display the viewport at a zoom factor such that the first symbol and the symbol for each of the at least one other object are visible in the display.

27. The computer-readable medium of claim 25, wherein the computer-readable medium is further encoded with executable instructions that, when executed, cause one or more data processing systems to:
- determine whether the object is related to at least one other object based on a hierarchical structure of the objects;
- generate a viewport for the first symbol that is centered on the first symbol in response to determining that the object is not related to at least one other object; and
- display the viewport based on the zoom factor for the depth.

28. The computer-readable medium of claim 21, wherein the computer-readable medium is further encoded with executable instructions that, when executed by at least one processor, cause one or more data processing systems to:
- receive a user input comprising a selection of an area of a graphical user interface;
- generate a viewport comprising the selected area of the graphical user interface; and
- display the viewport at a zoom factor based on a size of the selected area.

29. The computer-readable medium of claim 21, wherein the computer-readable medium is further encoded with executable instructions that, when executed by at least one processor, cause one or more data processing systems to:
- receive a selection of a first symbol displayed in a graphical user interface;
- identify a centering mode selected; and
- center the display based on the first symbol and disabling scrolling in the display in the graphical user interface in response to identifying that a point centered mode is selected.

30. The computer-readable medium of claim 21, wherein the computer-readable medium is further encoded with executable instructions that, when executed by at least one processor, cause one or more data processing systems to:
- receive a selection of a first symbol displayed in a graphical user interface;
- identify an object represented by the first symbol;
- identify a centering mode selected;
- identify at least one other object related to the object based on a hierarchical structure of the objects to form a group of objects in response to identifying that a group centered mode is selected;
- center the display on symbols for the group of objects; and
- disable scrolling in the display.

* * * * *